US011354865B2

(12) United States Patent
Moroze et al.

(10) Patent No.: US 11,354,865 B2
(45) Date of Patent: Jun. 7, 2022

(54) FUNNEL VISUALIZATION WITH DATA POINT ANIMATIONS AND PATHWAYS

(71) Applicant: Oracle International Corporation, Redwood Shores, CA (US)

(72) Inventors: Benjamin L. Moroze, Lexington, MA (US); Brendon Charles Glazer, Billerica, MA (US); Kapaya Katongo, Cambridge, MA (US); Kris L. Hanson, Stoneham, MA (US); Hendrik van den Broek, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/658,165

(22) Filed: Oct. 21, 2019

(65) Prior Publication Data

US 2020/0126307 A1    Apr. 23, 2020

Related U.S. Application Data

(60) Provisional application No. 62/748,504, filed on Oct. 21, 2018.

(51) Int. Cl.
*G06T 19/00* (2011.01)
*G02B 27/01* (2006.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
None
See application file for complete search history.

(56) References Cited

U.S. PATENT DOCUMENTS

| | | | | |
|---|---|---|---|---|
| 5,748,192 A | * | 5/1998 | Lindholm | G06T 3/005 345/427 |
| 6,552,722 B1 | | 4/2003 | Shih et al. | |
| 6,665,648 B2 | * | 12/2003 | Brodersen | G05B 19/045 705/7.11 |
| 7,849,416 B2 | | 12/2010 | Chandhoke et al. | |

(Continued)

OTHER PUBLICATIONS

Kim et al. "Tornado Motion Synthesis from Video Footage;" The Ohio State University Technical Report TR02; 2006; pp. 1-8 (Year: 2006).*

(Continued)

*Primary Examiner* — Edward Martello
(74) *Attorney, Agent, or Firm* — Kilpatrick Townsend & Stockton LLP

(57) ABSTRACT

A plurality of visualization objects may be provided for representing one or more data sets in a virtual 3D space. The visualization objects may include funnels, containers, name cards, and so forth. The visualization objects can be arranged in a circular carousel that can be rotated around a position of a virtual camera or user in a VR/AR environment. Individual data points in the visualization objects can be rotated, sized, positioned, colored, or otherwise characterized based on attributes of the corresponding data points. Individual data points can also be animated as transitioning between visualization objects in a unified view. Voice commands can be interpreted as part of an interactive environment that can provide views of the visualization objects to multiple devices simultaneously.

20 Claims, 21 Drawing Sheets

(51) Int. Cl.

| | | |
|---|---|---|
| *G06F 3/01* | (2006.01) | |
| *G06F 3/0481* | (2022.01) | |
| *G06T 11/20* | (2006.01) | |
| *G06T 15/20* | (2011.01) | |
| *G06T 19/20* | (2011.01) | |
| *G06F 16/904* | (2019.01) | |
| *G06T 13/20* | (2011.01) | |
| *G06F 16/54* | (2019.01) | |
| *G06T 13/40* | (2011.01) | |
| *G06F 3/04815* | (2022.01) | |

(52) U.S. Cl.
CPC .......... *G06F 3/017* (2013.01); *G06F 3/04815* (2013.01); *G06F 16/54* (2019.01); *G06F 16/904* (2019.01); *G06T 11/20* (2013.01); *G06T 11/206* (2013.01); *G06T 13/20* (2013.01); *G06T 13/40* (2013.01); *G06T 15/20* (2013.01); *G06T 19/00* (2013.01); *G06T 19/003* (2013.01); *G06T 19/20* (2013.01); *G06T 2219/024* (2013.01); *G06T 2219/028* (2013.01); *G06T 2219/2012* (2013.01)

(56) References Cited

U.S. PATENT DOCUMENTS

| | | | |
|---|---|---|---|
| 9,529,892 | B2 | 12/2016 | Tibrew al et al. |
| 9,749,367 | B1 | 8/2017 | Kirby et al. |
| 10,255,302 | B1 | 4/2019 | Cosic |
| 10,261,589 | B2 | 4/2019 | Sakai |
| 10,984,601 | B2 | 4/2021 | Moroze et al. |
| 2005/0004944 | A1 | 1/2005 | Cossins et al. |
| 2006/0179412 | A1 | 8/2006 | Clymer et al. |
| 2007/0265904 | A1* | 11/2007 | Lindquist ............ G06Q 10/0639 705/7.31 |
| 2008/0134059 | A1 | 6/2008 | Kumar et al. |
| 2008/0278478 | A1 | 11/2008 | Dillenberger et al. |
| 2010/0023859 | A1 | 1/2010 | Dawson et al. |
| 2010/0079356 | A1 | 4/2010 | Hoellwarth |
| 2010/0325564 | A1* | 12/2010 | Mital .................... G06T 11/206 715/757 |
| 2011/0169927 | A1 | 7/2011 | Mages et al. |
| 2012/0041990 | A1 | 2/2012 | Kreindlina et al. |
| 2013/0113820 | A1* | 5/2013 | Molesky ................. G06T 11/00 345/592 |
| 2014/0040257 | A1 | 2/2014 | Chandrasekaran |
| 2014/0365927 | A1 | 12/2014 | Sakai |
| 2016/0343155 | A1* | 11/2016 | Reeves ................. G06T 11/206 |
| 2016/0379226 | A1* | 12/2016 | Mayer-wolf ........ G06F 3/04842 705/7.29 |
| 2017/0017908 | A1 | 1/2017 | Bracher et al. |
| 2017/0193688 | A1 | 7/2017 | Djorgovski et al. |
| 2017/0212723 | A1 | 7/2017 | Atarot |
| 2017/0230576 | A1 | 8/2017 | Sparks et al. |
| 2017/0302709 | A1 | 10/2017 | Jones et al. |
| 2018/0061125 | A1 | 3/2018 | Xia et al. |
| 2018/0158245 | A1 | 6/2018 | Govindan |
| 2018/0173372 | A1 | 6/2018 | Greenspan et al. |
| 2018/0190030 | A1 | 7/2018 | Wu et al. |
| 2018/0276892 | A1 | 9/2018 | Isaacs et al. |
| 2019/0121826 | A1* | 4/2019 | LeVell ................. G06F 3/04845 |
| 2019/0220157 | A1* | 7/2019 | Crouch ................. G06F 3/0484 |

OTHER PUBLICATIONS

"3D Charts", Unvi Art, Youtube, Retrieved from the Internet: https://www.youtube.com/watch?v=cDfSSIIIZvE, Jan. 22, 2012, 1 page.

Belcher et al., "Using Augmented Reality for Visualizing Complex Graphs in Three Dimensions", Proceedings of the Second IEEE and ACM International Symposium on Mixed and Augmented Reality, Oct. 7, 2003, 9 pages.

Domanin; Oleg, "Three Minute Video Tour of Fusioncharts.Flv", YouTube, Available Online at https://www.youtube.com/watch?v=X0ogik1eA78, Jan. 5, 2010, 1 page.

Heer et al., "Animated Transitions in Statistical Data Graphics", IEEE Transactions on Visualization and Computer Graphics, IEEE Service Center, vol. 13, No. 6, Nov. 2007, pp. 1240-1247.

Jeong, et al., It's not What It Speaks, but It's How It Speaks: A Study into Smartphone Voice-User Interfaces (VUI), International Conference on Financial Cryptography and Data security, pp. 284-291, Jul. 21, 2015.

Vollmer, et al. Hierarchical Spatial Aggregation for Level~of-Detail Visualization of 3D Thematic Data, Acm Transactions on Spatial Algorithms and Systems, vol. 4, No. 3, Article 9. pp. 9:1-9:23, Sep. 2018.

International Application No. PCT/US2019/057158, International Search Report and Written Opinion dated Feb. 11, 2020, 13 pages.

International Application No. PCT/US2019/057161, International Search Report and Written Opinion dated Feb. 11, 2020, 13 pages.

International Application No. PCT/US2019/057171, International Search Report and Written Opinion dated Jan. 31, 2020, 15 pages.

International Application No. PCT/US2019/057173, International Search Report and Written Opinion dated Jan. 22, 2020, 10 pages.

International Application No. PCT/US2019/057164, International Search Report and Written Opinion dated Feb. 18, 2020, 12 pages.

Polhemus; Neil, "Three-Dimensional Dynamic Data Visualizer", stagraphics centurion, Youtube, Available Online at: https://www.youtube.com/watch?v=1vlFzxznpaY, Dec. 16, 2014, 4 pages.

Saini; Kirti, "Learn to Create Funnel Diagram Design in Powerpoint", The SlideTeam Blog, Available Online at: https://www.slideteam.net/blog/powerpoint-tutorial-18-how-to-create-a-stunning-funnel-diagram-for-your-business-presentation, Jul. 18, 2016, 20 pages.

International Application No. PCT/US2019/057171, Invitation to Pay Additional Fees and, Where Applicable, Protest Fee dated Dec. 10, 2019, 10 pages.

U.S. Appl. No. 16/658,162, Final Office Action dated Jan. 26, 2021, 24 pages.

U.S. Appl. No. 16/658,169, Non-Final Office Action, dated Oct. 15, 2020, 17 pages.

U.S. Appl. No. 16/658,162, First Action Interview Communication, not yet mailed Oct. 24, 2020, all pages.

U.S. Appl. No. 16/658,180, Non-Final Office Action dated Sep. 11, 2020, 11 pages.

U.S. Appl. No. 16/658,177, Non-Final Office Action dated Dec. 1, 2020, 31 pages.

Ejaz et al., *Interactive 3D Visualization of Social Network Data Using Cloud Computing*, International Conference on Cloud Computing and Social Netw orking (ICCCSN), IEEE, Apr. 26-27, 2012, 4 pages.

U.S. Appl. No. 16/658,162, Non-Final Office Action dated May 27, 2021, 20 Pages.

U.S. Appl. No. 16/658,169, Non-Final Office Action dated Apr. 27, 2021, 21 pages.

U.S. Appl. No. 16/658,177 received a Final Office Action dated Mar. 15, 2021, 34 pages.

U.S. Appl. No. 16/658,162 received a Final Office Action dated Sep. 13, 2021, 22 pages.

U.S. Appl. No. 16/658,169 received a Final Office Action dated Sep. 22, 2021, 24 pages.

U.S. Appl. No. 16/658,177 received a Non-Final Office Action dated Oct. 20, 2021, 37 pages.

\* cited by examiner

FUNNEL VISUALIZATION WITH DATA POINT ANIMATIONS AND PATHWAYS

CROSS-REFERENCE TO RELATED APPLICATION

The present application is a non-provisional application of, and claims the benefit and priority under 35 U.S.C. 119(e) of U.S. Provisional Application No. 62/748,504, filed Oct. 21, 2018, entitled "3D VISUALIZATION SERVICES INTEGRATING VARIOUS DATA SOURCES AND DISPLAY DEVICES," the entire contents of which are incorporated herein by reference for all purposes.

The present application is also related to the following four US patent applications:
- U.S. patent application Ser. No. 16/658,162 filed on Oct. 21, 2019 entitled "INTERACTIVE DATA EXPLORER AND 3-D DASHBOARD ENVIRONMENT" by Moroze et al., which is incorporated herein in its entirety.
- U.S. patent application Ser. No. 16/658,169 filed on Oct. 21, 2019 entitled "OPTIMIZING VIRTUAL DATA VIEWS USING VOICE COMMANDS AND DEFINED PERSPECTIVES" by Moroze et al., which is incorporated herein in its entirety.
- U.S. patent application Ser. No. 16/658,177 filed on Oct. 21, 2019 entitled "ANIMATION BETWEEN VISUALIZATION OBJECTS IN A VIRTUAL DASHBOARD" by Moroze et al., which is incorporated herein in its entirety.
- U.S. patent application Ser. No. 16/658,180 filed on Oct. 21, 2019 entitled "DATA VISUALIZATION OBJECTS IN A VIRTUAL ENVIRONMENT" by Moroze et al., which is incorporated herein in its entirety.

BACKGROUND

One of the most effective ways to convey formation is through visualization. Capturing and categorizing information is typically not sufficient to gain a full understanding of conclusions that may be drawn from the data. Although two-dimensional data visualizations dominate much of our communication technology, many of these visualization techniques are not optimized for highlighting or emphasizing aspects of the data collection. Effective data visualization involves creating informative visuals that communicate an aspect of the data very quickly. At times, simple visualizations are sufficient. However, with complex multidimensional data, the complexity of the data set itself may make adequate visualization difficulty limited dimensional spaces.

SUMMARY

A method for generating a visualization object from a set of data points may include receiving one or more data sets; generating a plurality of 3D objects corresponding to data points in the one or more data sets; arranging the plurality of 3D objects in a predetermined 3D shape; and controlling the appearance and position of the 3D objects within the predetermined 3D shape based on attribute values for the corresponding data points.

A non-transitory computer-readable medium may include instructions that, when executed by one or more processors, cause the one or more processors to perform operations including receiving one or more data sets; generating a plurality of 3D objects corresponding to data points in the one or more data sets; arranging the plurality of 3D objects in a predetermined 3D shape; and controlling the appearance and position of the 3D objects within the predetermined 3D shape based on attribute values for the corresponding data points.

A system may include one or more processors and one or more memory devices that may include instructions that, when executed by the one or more processors, cause the one or more processors to perform operations including receiving one or more data sets; generating a plurality of 3D objects corresponding to data points in the one or more data sets; arranging the plurality of 3D objects in a predetermined 3D shape; and controlling the appearance and position of the 3D objects within the predetermined 3D shape based on attribute values for the corresponding data points.

In any embodiments any of the following features may be implemented in any combination and without limitation. The predetermined 3D shape may include a funnel object. The 3D objects may include spheres that are arranged to form the funnel object. The spheres may rotate around a circumference of the funnel object. The spheres may rotate at a speed and/or radius that is determined by the attribute values for the corresponding data points. The spheres may be colored based on the attribute values of the corresponding data points. The funnel object may be divided into a plurality of sections. The plurality of 3D objects may be located in the plurality of sections based on the attribute values for the corresponding data points. The method/operations may also include inserting timestamps into the predetermined 3D shape at a plurality of points along the animation or path. The animation may include the 3D object rotating around the predetermined 3D shape over time. A speed of the animation may be based on attributes of the corresponding data points in the one or more data sets. The animation or path may be represented by a spline object in a virtual environment. The method/operations may also include providing a plurality of views of the plurality of 3D objects in a virtual environment to a plurality of client devices. The plurality of client devices may include a virtual reality headset.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Described herein, are embodiments for an immersive user interface (UI) experience. The immersive user interface experience may be wrapped as individual components that can be inserted into a component exchange or clearinghouse that can later be used by application developers or service developers to add interactive UI components to their applications or services. These UI components can be used to differentiate applications in a crowded marketplace and to provide a user-friendly, interactive, immersive experience that provides detailed and intuitive data visualization for many different data types on many different user devices.

Figure 1:
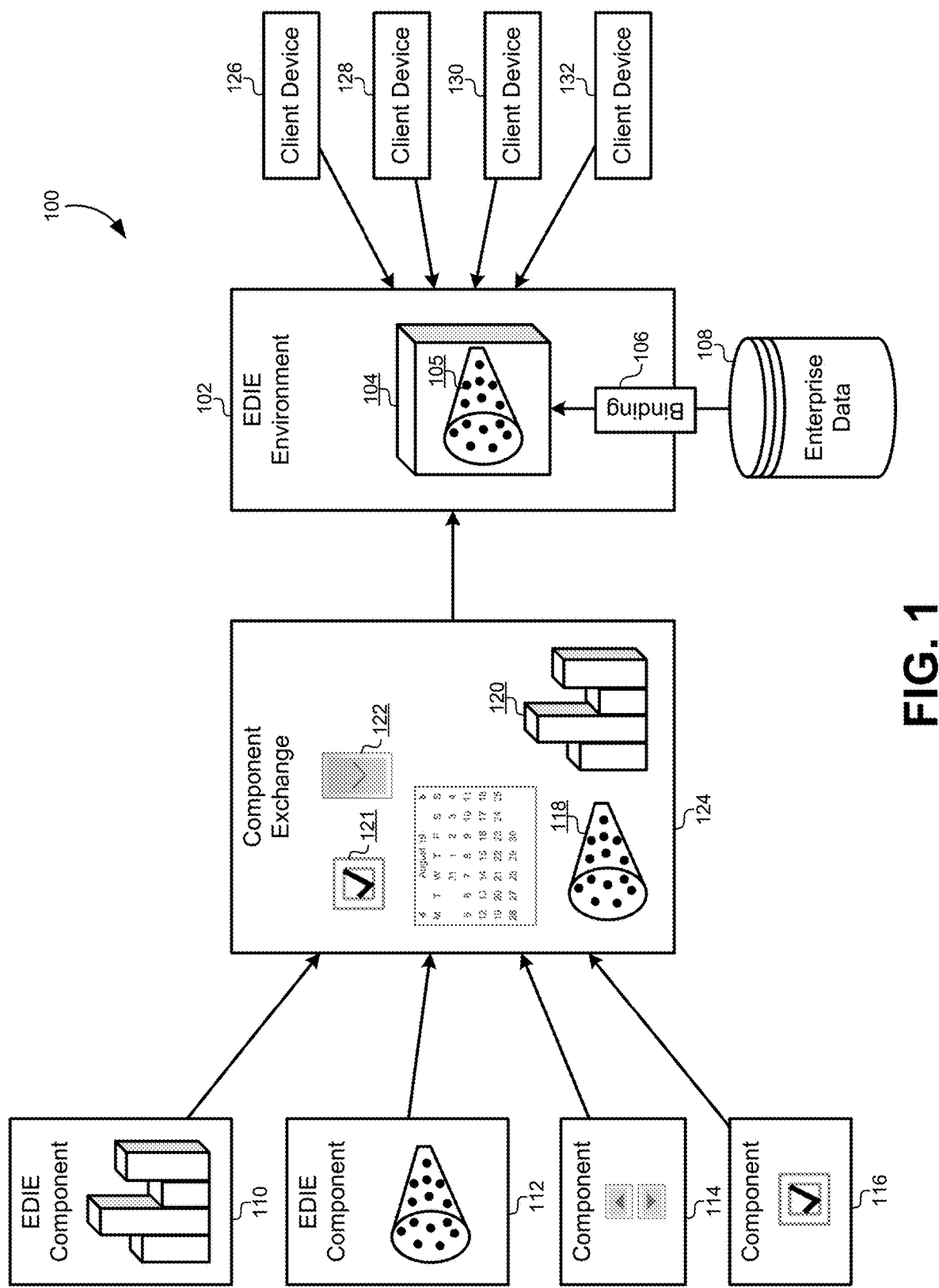
FIG. 1 illustrates a system for authoring, providing, and using interactive data displays, according to some embodiments.

FIG. 1 illustrates a system for authoring, providing, and using interactive data displays, according to some embodiments. The system may include a component exchange 124. The component exchange 124 may be part of an application development suite that allows users to develop applications and/or services using a custom development environment and a library of predefined tools and/or interfaces. The application development suite may be a cloud-hosted development environment that may be accessible as a Software as a Service (SaaS) model for many different client devices. The development environment may be configured to develop and/or deploy many different types of applications, including cloud-based services or micro services, web applications, mobile device applications, enterprise applications, and/or the like. Applications designed in the application development suite may be integrated with other SaaS applications through Representational State Transfer (REST) interfaces.

The development environment in the application development suite may include a number of user-friendly tools that may be used by developers to streamline the development process and make the overall application development cycle more efficient. These tools may include WYSIWYG tools and other graphical interfaces that allow developers to drag-and-drop various prepackaged components into an application development space. Various components may be offered by the development environment, such as reusable business objects, processes, web controls, user interface controls, themes, templates, and other aspects of an application.

A developer may use the development environment to design and test an application, and then the application may be deployed to various operating environments. When the application is deployed to an operating environment, the development environment may also deploy any additional code or libraries required by the application such that it can operate in the target environment. Thus, the flexibility and reusable components provided by the development environment can be ported to any operating environment without losing any of the functionality provided by the development environment.

In this example, the development environment may include a component exchange. For example, the development environment may be implemented using any commercially available development environment, such as Visual Builder® from Oracle®. The development environment may include various toolkits, such as collections of proprietary and/or open source JavaScript libraries that may be used to build applications. For example, the development environment may include components from the JavaScript Extension Toolkit (JET)® from Oracle®. Components in these toolkits may include a rich set of user interface (UI) components that include data models, view models, and ports for binding data to the components. In some embodiments, the development environment may provide a unified component plug-in mechanism based on standard components, such as the W3C Web Components standard, while still allowing custom components to work alongside standard components.

The component exchange 124 may allow component developers to upload components to the component exchange 124 for use by application developers. This allows component developers to provide flexible component architectures that can be maintained and upgraded throughout the component lifecycle. For example, these components may include standard web components, such as a checkbox component 116 or a slider component 114 that may be used in various user interfaces. These components 114, 116 can be uploaded to the component exchange 124 and then updated and maintained throughout their lifecycle by component development teams. They may then be provided as components 121, 122 in the component exchange 124 for application developers.

In addition to standard web components, the embodiments described herein allow users to develop special visualization objects that can be used in an Enterprise Data Interactive Explorer (EDIE) environment. These visualization objects provide multidimensional views of enterprise data sets that may be simultaneously viewed by a plurality of client devices through separate network connections. These visualization objects can be imported into the component exchange 124 in the same manner as standard web components are imported into the component exchange 124. These visualization objects can then imported into individual applications under development. In those applications, developers can bind various enterprise data sets from any number of different sources to parameterized inputs on the visualization objects. The visualization objects can then be used to generate rendered views of virtual objects that represent and visualize the enterprise data in a multidimensional environment.

Various examples of these visualization objects may be described in greater detail below in this disclosure. FIG. 1 illustrates a few examples of visualization objects that can be imported into the component exchange 124 as regular objects. For example, a funnel object 112 may comprise a rotating funnel object that illustrates a progression of data points in an enterprise data set over time. Various visual effects may be provided with the funnel object 112 that may be used to highlight various aspects of the data set that are bound to the funnel object 112. For example, users may search the data set along various dimensions, alter individual data points, view data point pathways over time, see visual representations of the data as it is accelerated through time along various dimensions, and so forth.

FIG. 1 also illustrates a three-dimensional histogram or bar graph object 110 that may be used to represent various enterprise data sets. In the component exchange 124, the graph object 110 may be unconnected from any underlying data set. However, when imported into an actual application, the graph object 110 may be bound to an enterprise data set, and the various bars in the graph may be resized based on the data binding. The visualization object may be used to generate a three-dimensional (3D) virtual object in a virtual environment that may be viewed by the various client devices. For example, the graph object 110 may be implemented as a plurality of three-dimensional cylinders, each representing a bar in the graph. The users may enter the virtual environment and walk around the virtual object, interact with the object, change values in the object, manipulate portions of the object, and have those changed values seen by other users and stored back to the underlying database storing the data set.

The visualization objects 110, 112 described above are provided by way of example and are not meant to be limiting. Any multidimensional object that can be used to visualize enterprise data sets may be used as a visualization object in this disclosure. Other visualization objects may include charts, animations, pictures, graphs, and so forth.

In the component exchange 124, the visualization objects may be represented as components 118, 120 that can be selected by a developer and imported into an application during development. For example, the developer may drag-and-drop the component 118 for the funnel object 112 into an application. This visualization object can then be bound to a data set either in the development environment or in the deployment environment, depending on the embodiment.

In some embodiments, an application that includes one or more visualization objects may be deployed to various environments. These environments may include web applications, mobile applications, client-side applications, applications run on gaming systems, applications run on desktop or laptop computers, applications for virtual environments, such as virtual reality or augmented reality systems, and/or any other computing environment. When the application is deployed to environment, the component exchange 124 can deploy any necessary libraries, third-party libraries, or other software components or libraries required to run the visualization object. For example, some visualization objects operating in a 3D environment may include OpenGL libraries or other 3D visualization libraries required for their operation.

The application may be deployed to an environment 102 generically referred to herein as an EDIE environment that may include a number of standard components along with one or more visualization objects as described above. The environment 102 may include a virtual environment 104 in which the visualization objects may be instantiated. When the visualization objects are instantiated, they can be bound to one or more underlying data sets. These data sets may be acquired from various sources, such as database tables, multidimensional data cubes, web services, server-side applications, API interfaces, and so forth. In the example of FIG. 1, the enterprise database 108 may provide values from one or more database tables to the environment 102 for use with at least one of the visualization objects. In this example, the funnel object 112 may be deployed to the environment 102 in the virtual environment 104. The funnel object 112 may include a set of inputs, such as parameterized inputs that can be individually and/or collectively bound to tables or rows in the enterprise data set from the enterprise database 108. A binding 106 between data set values and parameterized inputs of the visualization object may be created in the development environment, in the deployment environment 102, and/or at any other time. The binding 106 may also be adjusted or reformed with different data sets dynamically at runtime or prior to executing the application.

When the data set is bound to the visualization object, the visualization object can be used to generate a virtual object in the virtual environment 104. This may include using the values from the data set to size or dimension various portions of a virtual object. The values from the data set may also be used to generate animation speeds or motion vectors for objects within the virtual object. The values from the data set may also be used to color or otherwise affect the visual representation of objects in the virtual object. For example, a data point may rotate around a virtual funnel created by the funnel object 112. The data point may have a color determined by one dimension, a size or radius determined by a second dimension, a speed of rotation determined by third dimension, a trajectory or motion vector direction determined by a fourth dimension, and so forth.

The visualization object generated in the virtual environment 104 may be viewed and/or interacted with by a number of different client devices 126, 128, 130, 132. These client devices may include laptop computers, desktop computers, workstations, tablet computers, smart phones, smart watches, smart TVs, video gaming consoles, digital home assistants, smart glasses, virtual reality headsets, augmented reality headsets, and any other computing device. Each of these client devices 126, 128, 130, 132 may receive a unique view into the virtual environment 104 corresponding to a uniquely placed virtual camera for each client device 126, 128, 130, 132. Users may then interact with the virtual object 105 in the virtual environment 104 to view, manipulate, edit, and/or update the underlying data set using the virtual object 105. As described below, each user may be provided a unique, specific view of the virtual object 105, and different settings may allow the users to change the underlying data such that the virtual object 105 changes in the views provided to other client devices. At each client device, 126, 128, 130, 132 automatic hardware detection may be used to provide the correct view of the virtual environment 104. For example, if client device 126 is implemented by a desktop computer, then the environment 102 can provide a two-dimensional (2D) view of the virtual environment 104. In comparison, if client device 128 is implement by a virtual reality headset, then the environment 102 can provide a 3D view of the virtual environment 104 such that the user of the client device 128 is immersed in the virtual environment 104 to interact therein.

Figure 2:
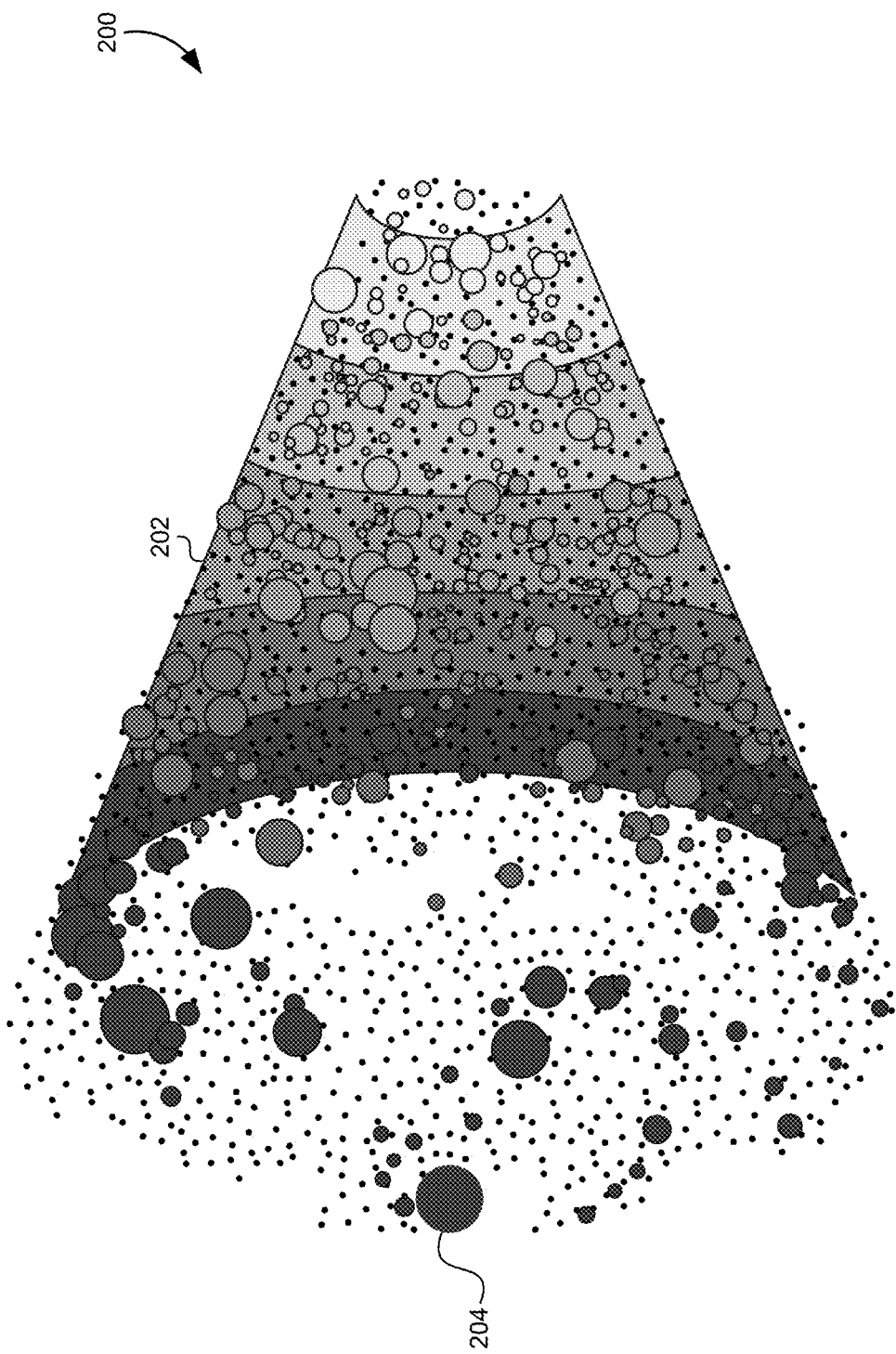
FIG. 2 illustrates an example of a virtual object that has been bound to an enterprise data set, according to some embodiments.

FIG. 2 illustrates an example of a virtual object 202 that has been bound to an enterprise data set, according to some embodiments. As described above, the virtual object 202 may correspond to the funnel object 112 that was uploaded as a component 118 in the component exchange 124 FIG. 1. The virtual object 202 may comprise a 3D funnel object, where the funnel is formed by a plurality of individual data points. The individual data points from the data set may be used to define the location, color, trajectory, movement, speed, size, shape, and/or any other visual characteristic of each of the individual data points.

The underlying data set may be sourced from a database table, a multidimensional data cube, and/or any other data structure. The data set may include data points represented by rows in a database table or points in a multidimensional data cube. Individual columns in the database or dimensions in the data cube can be used to define characteristics for each of the spheres in the virtual object 202. For example, a first dimension or first column in the database may be used to determine the size or circumference of each of the spheres. A second dimension or column value may be used to define the color or texture applied to each of the spheres in the virtual environment. A third dimension or column value may be used to define a location of each sphere in the funnel. A fourth dimension or column value may define a speed with which the sphere rotates around a center axis of the funnel. A fifth dimension or column value may define a trajectory or motion path as it moves through various levels of the funnel, and so forth.

The data may remain bound to each of the elements of the virtual object 202 as the application is running. For example, while wearing a virtual reality headset, a user may approach the virtual object 202 in the virtual environment 200. Using a virtual selection handheld device, the user may reach out and "grab" one of the spheres 204 rotating around the funnel axis. The user may bring up a user interface that displays additional information regarding the underlying data represented by the sphere 204. The user may change values in the user interface to change the underlying value in the corresponding database. The user may also "place" the sphere 204 back into a location in the virtual object 202. If the new location of the sphere 204 is different from the old location, the dimension used to determine the location of the sphere 204 in the virtual object 202 may be updated in the underlying database.

Figure 3:
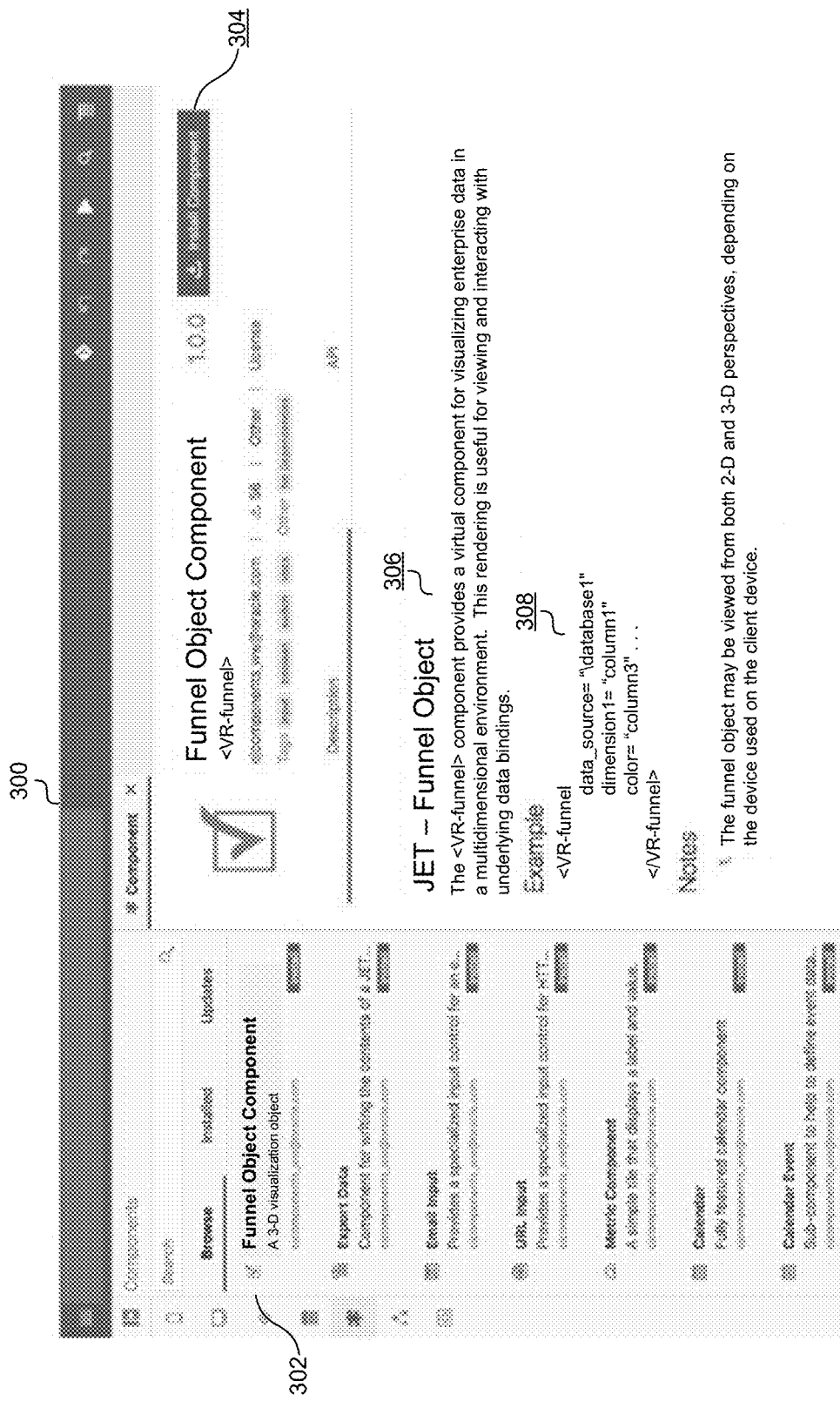
FIG. 3 illustrates a user interface for importing components from the component exchange into an application.

FIG. 3 illustrates a user interface 300 for importing components from the component exchange into an application. The user interface 300 may include a list 302 of available components that may be imported into a project. By selecting one of the components in the list 302, the component exchange may display additional information for downloading, instantiating, and/or using the component. In this example, the user has selected the funnel object component described previously. When this selection is made from the list 302, the right-hand side of the interface 300 may display additional information for using the funnel object component.

The additional information may include a description 306 of the component. This description 306 may describe the operation of the component, how it may be used, how it may interact with other components, typical usage scenarios, tips and advice for using the component, and/or other information that may be useful for new and/or experienced users of the component.

The description 306 may be accompanied by example code 308 that illustrates how the component may be integrated into the code of an application. The example code 308 may be provided in various programming languages and may be copied and pasted from the example code 308 into the code of the application.

Additionally, some embodiments may provide an install button 304. The install button may execute a process for installing the component in the user's application. Selecting the install button 304 may launch additional windows, wizards, and/or interfaces that walk user through the process of installing the component in their application. For example, the install button 304 may trigger one or more web forms to be generated that allow the user to select data sets that may be bound to the parameterized interfaces of the component. For example, the install button 304 may generate an interface that allows the user to bind the spheres in the funnel object to individual columns in a database. The install button 304 may also automatically download any code necessary for operating the component. This code may include third-party databases, graphic libraries, function libraries, and/or other shared code that may be required for executing the operations provided by the component.

Figure 4:
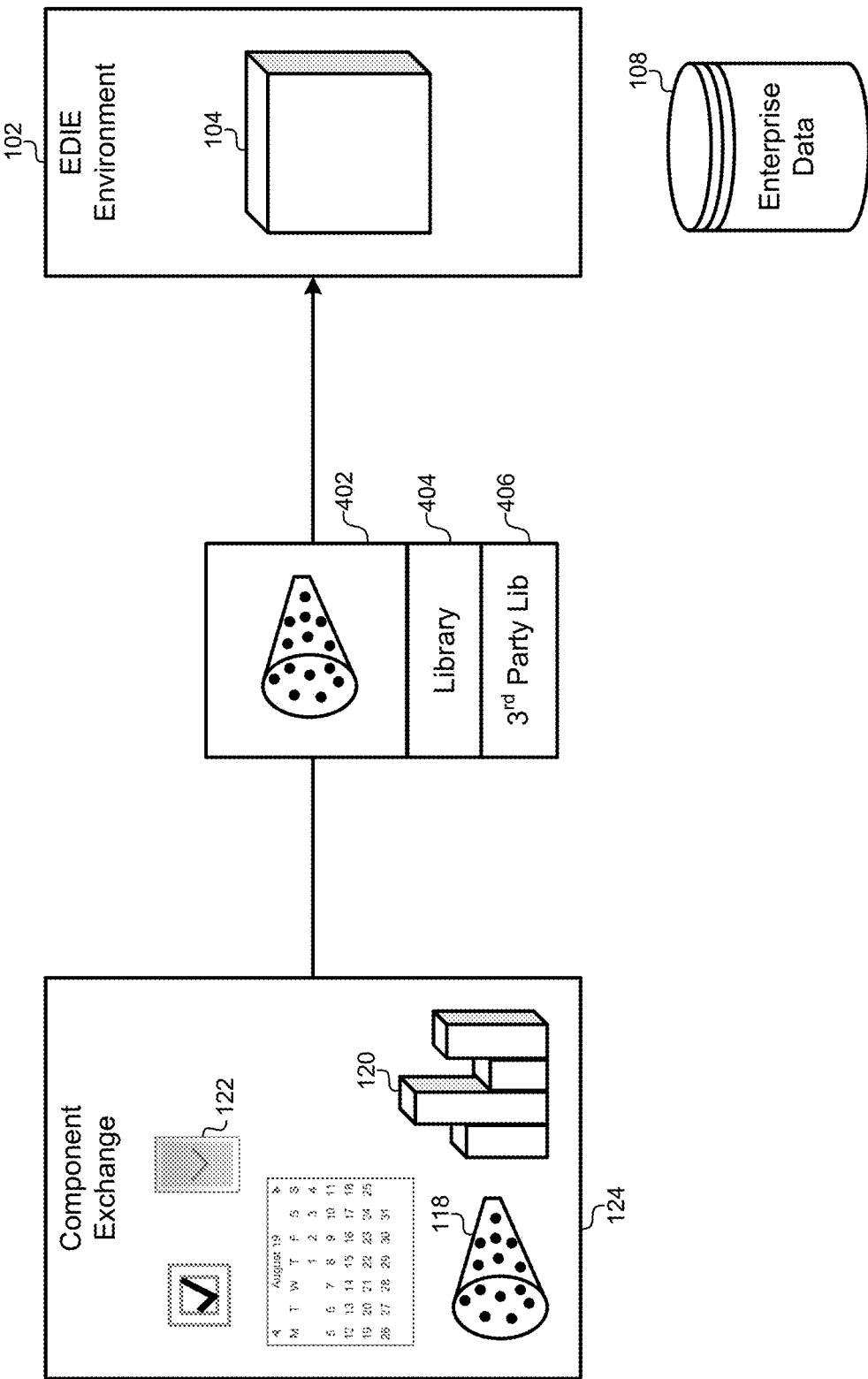
FIG. 4 illustrates a block diagram of a process for downloading and instantiating a component in an application, according to some embodiments.

FIG. 4 illustrates a block diagram of a process for downloading and instantiating a component in an application, according to some embodiments. Using the user interface described above in FIG. 3, the user may select the funnel object 402 to use as part of an application under development. The code for the funnel object 402 may be downloaded to an operating environment on the client device that is configured to utilize this type of component. For example, the funnel object 402 may be downloaded into the EDIE environment 102 operating on any of the client devices described above. The EDIE environment 102 may include a virtual environment 104 that may provide an environment in which three-dimensional (3D) components may be instantiated for both two-dimensional (2D) and 3D viewing.

In addition to downloading the code for the funnel object 402, the component exchange 124 may also provide any additional code required to run the component in the EDIE environment 102. This additional code may be stored in code libraries 404 that are stored and made available by the component exchange 124. The additional code may also include libraries 406 from third parties that are not hosted and/or provided by the component exchange 124. For example, the component exchange 124 may cause a library of graphic manipulation code to be downloaded from a third party website as part of the installation process for the funnel object 402. All of this code may be downloaded to the EDIE environment 102 such that the funnel object 402 can be operated in a standalone fashion with all of its required functionality.

When the funnel object 402 is downloaded to the EDIE environment 102 and instantiated in the virtual environment 104, the EDIE environment 102 may cause a binding to take place between the parameterized inputs of the funnel object 104 and one or more data sources. For example, the EDIE environment 102 may present a user interface to the user allowing the user to select from one of a plurality of available data sources. Upon selecting a data source, a request may be made to the user to bind individual fields in the data source to individual parameterized inputs. For example, the user may select a particular column in a database such that the values in that column determine a color corresponding spheres in the funnel object in the virtual environment 104. The binding between the parameterized inputs and the individual data sources may be stored as part of the application, such that whenever the application is launched by the user, the funnel object 402 retrieves data from the underlying data source to generate the display of the funnel object in the virtual environment 104. This binding may be updated and/or changed when the application is launched or dynamically as the application is run to visualize different data sets in the virtual environment 104.

The example of FIG. 4 illustrates an enterprise data store 108 that may be used to bind enterprise data to the parameterized inputs of various visualization objects. In other examples, different data sources may be bound to different aspects of the visualization object. For example, some embodiments may allow columns or fields from multiple databases and multiple locations to be bound to parameterized inputs of the same virtualization object. Some embodiments may use online data sources that provide real-time data to the visualization component. Any combination of data source may be provided to the parameterized inputs of the virtualization object based on the needs of the individual application designer.

The use of the funnel object 402 in FIGS. 3-4 is provided only by way of example and is not meant to be limiting. It will be understood that any visualization object designed to operate in the EDIE environment 102 may be implemented in the EDIE environment 102 using a similar procedure.

Figure 5:
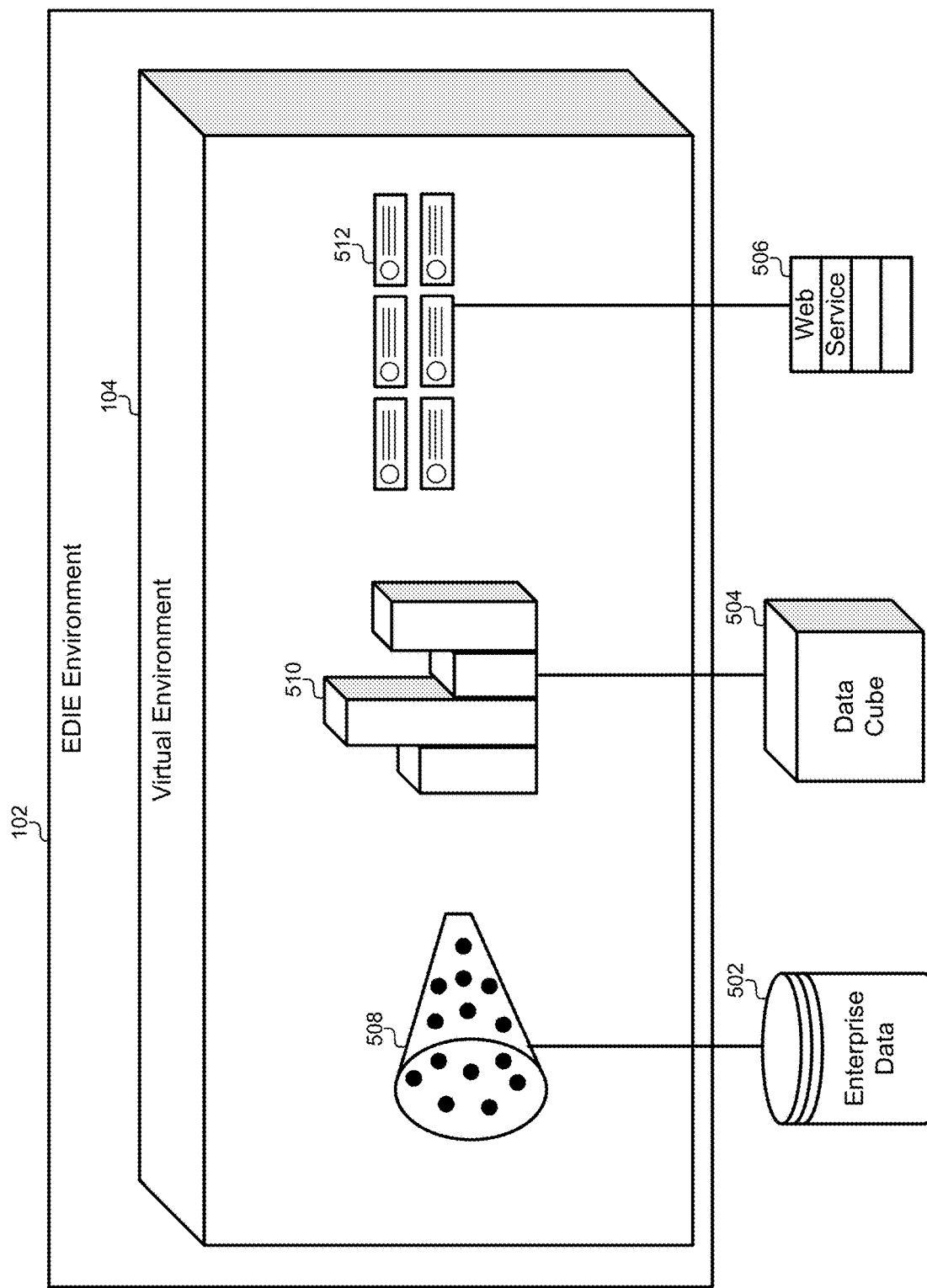
FIG. 5 illustrates a virtual dashboard created in the virtual environment, according to some embodiments.

FIG. 5 illustrates a virtual dashboard created in the virtual environment 104, according to some embodiments. Although the visualization components described herein may be used in any type of application, they may be particularly well suited for designing a virtual dashboard. As used herein, the term dashboard may include a visualization that aggregates, analyzes, and/or displays information from one or more data sources in a user interface. A dashboard may be provided on a homepage of an organization's website. A dashboard may also be displayed as an entry screen in an application or mobile app. The dashboard generally displays "widgets" or other graphical representations of data in a two-dimensional environment. Users may often be able to select individual widgets on the dashboard to display additional information. For example, a user may click on a widget displaying summary sales information for a current month. The widget may be configured to provide additional information regarding the summary sales information displayed in the dashboard. Some dashboards may include multiple widgets that can be configured to display up-to-date information from the underlying data sources as the dashboard is visited by various user client devices.

The embodiments described herein implements a dashboard in the 3D virtual environment 104 using the visualization components described above. For example, instead of displaying 2D widgets on a computer screen, the user may use a client device that is enabled for interactions with a 3D virtual environment to provide a 3D visualization experience to view and manipulate dashboard data. Some embodiments may use virtual reality headsets or augmented reality devices that allow the user to enter the virtual environment 104 and perform live interactions with the visualization objects displaying the dashboard data. In the virtual environment 104, users may walk around the visualization objects, "grab" and manipulate portions of the visualization objects, interact with other users, and have their manipulation of the visualization objects update the underlying data sources. This changes the traditional 2D dashboard experience into an interactive, immersive virtual reality experience where data can be viewed in an interactive, live fashion.

The virtual environment may include a plurality of visualization objects. Instead of a plurality of 2D widgets, the 3D dashboard may include visualization objects that are placed in a virtual 3D environment 104. As users enter or view the 3D virtual environment, they may move around the virtualization objects to view them from any angle and manipulate them from any location. Additional examples of users interacting with the virtual environment 104 to interact with visualization objects are described in greater detail below.

As described above, a visualization object may refer to a software object that is represented by a body of code and/or its associated libraries. What is displayed in the virtual environment 104 may be referred to as a view of the visualization object. Each visualization object may be associated with a number of different views, and each view may provide a different look and feel for the visualization object. For example, the funnel object may include a traditional business view that displays the data in a more reserved fashion suitable for a business environment. The funnel object may also include an additional view that displays the data in a less formal manner, including brighter and more vibrant colors, more playful shapes, and/or other variations on ways to view the funnel object. For simplicity, the remainder of this disclosure will not distinguish between the underlying visualization object represented by the executable code and the view of the visualization object that is displayed in virtual environment 104. Instead, visualization objects (e.g., the funnel object) may be referred to uniformly as visualization objects to encompass both the code and the display in the virtual environment 104.

In this example, the virtual environment 104 may include a dashboard with three visualization objects. The funnel object 508 may be linked to the enterprise data store 502 described above. The graph object 510 may be linked to a multidimensional data cube 504 where dimensions in the data cube are bound to individual elements of the graph object 510. A personnel object 512 may include summary displays of individuals (e.g. similar to a virtual business card display) in a three-dimensional grid in the virtual environment 104. The personnel object may be bound to a web service 506 such that the personnel object may download information from the web service 504 to populate the individual items in the summary displays of individuals. These visualization objects may be rendered in various locations (e.g., in a semicircle) in the virtual environment 104. When the user enters the virtual environment 104, they may see the visualization objects 508, 510, 512 as objects in the area in front of them. To begin using the virtual dashboard, users may approach the visualization objects 508, 510, 512, view the visualization objects, and/or manipulate elements of the visualization objects as desired.

Figure 6:
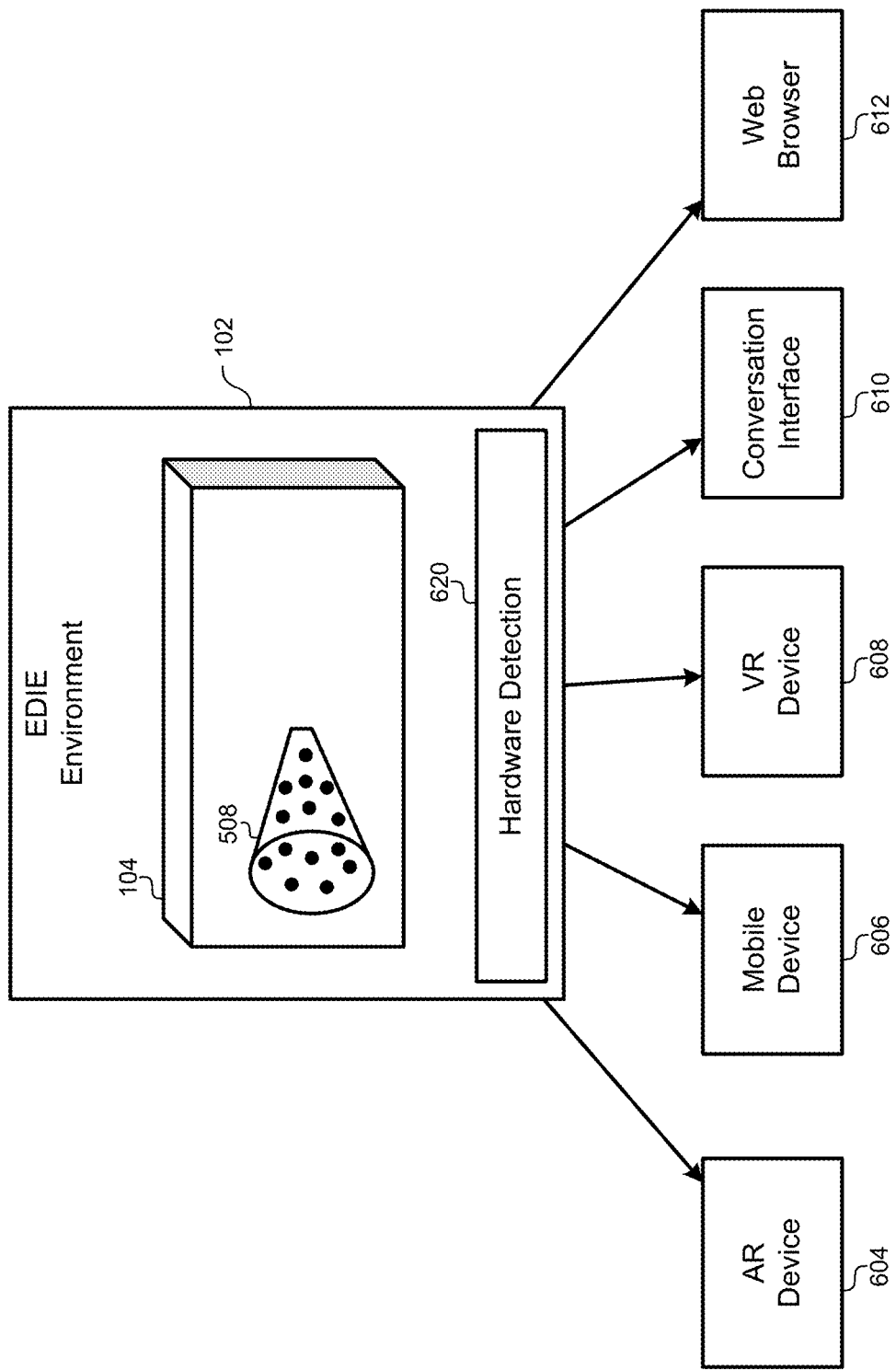
FIG. 6 illustrates how various types of client device systems and input devices can all interface simultaneously with the same virtual environment in the EDIE environment, according to some embodiments.

FIG. 6 illustrates how various types of client device systems and input devices can all interface simultaneously with the same virtual environment in the EDIE environment 102, according to some embodiments. The EDIE environment 102 may include a 3D data exploration platform that serves a number of different purposes and provides a number of different benefits. For example, the EDIE environment 102 may serve as a nexus for integration between important, convergent, new technologies that can make the exploration of enterprise data more immersive and fluid. These technologies may include conversational UI (e.g., voice-based or chat-based) 610, virtual reality (VR) 608, augmented reality (AR) 604, and many other interactive technologies. Users may also access these visualization technologies using traditional 2D computing tools, such as apps on mobile devices 606, web browsers 612 on display screens, and so forth. The EDIE environment 102 may provide a visualization that shifts seamlessly through transitions between devices. For example, a user may view a 3D visualization in a 2D environment, such as on a screen of a mobile device 606. The user may then put on a pair of virtual reality goggles and transition into a virtual reality space that includes the visualization objects that were displayed in a 2D fashion on the screen of the mobile device 606. In the virtual environment, the user can interact with the visualization objects using the hand controllers that are commonly included in VR systems as described below.

The EDIE environment 102 may include a hardware detection process 620 that detects the type of user input device used by the client device. For example, if the client device uses a traditional 2D display screen with a web browser 612, the hardware detection process 620 may detect that a 2D environment is interfacing with the virtual environment 104. The EDIE environment 102 may include interface code for each of these different types of input devices illustrated in FIG. 6. The hardware detection process 620 may identify the various input options that are available and load the interface code accordingly into the EDIE environment 102. The interface code may then generate a view of the virtual environment 104 that is compatible with the corresponding input device on the client device.

As described in greater detail below, the EDIE environment 102 may operate in a network mode such that the virtual environment 104 may be accessed by a plurality of different client devices simultaneously. This allows users to interact with each other in the virtual environment 104 while viewing the visualization objects bound to the underlying enterprise data. The hardware detection module 620 allows users to interact together in the virtual environment 104 based on their own viewing experience with their client device. For example, users entering the virtual environment 104 using a virtual reality device 608 may be visible in the virtual environment 104 as a displayed avatar for a another user viewing the virtual environment 104 from a 2D screen interface of a web browser 612.

Figure 7:
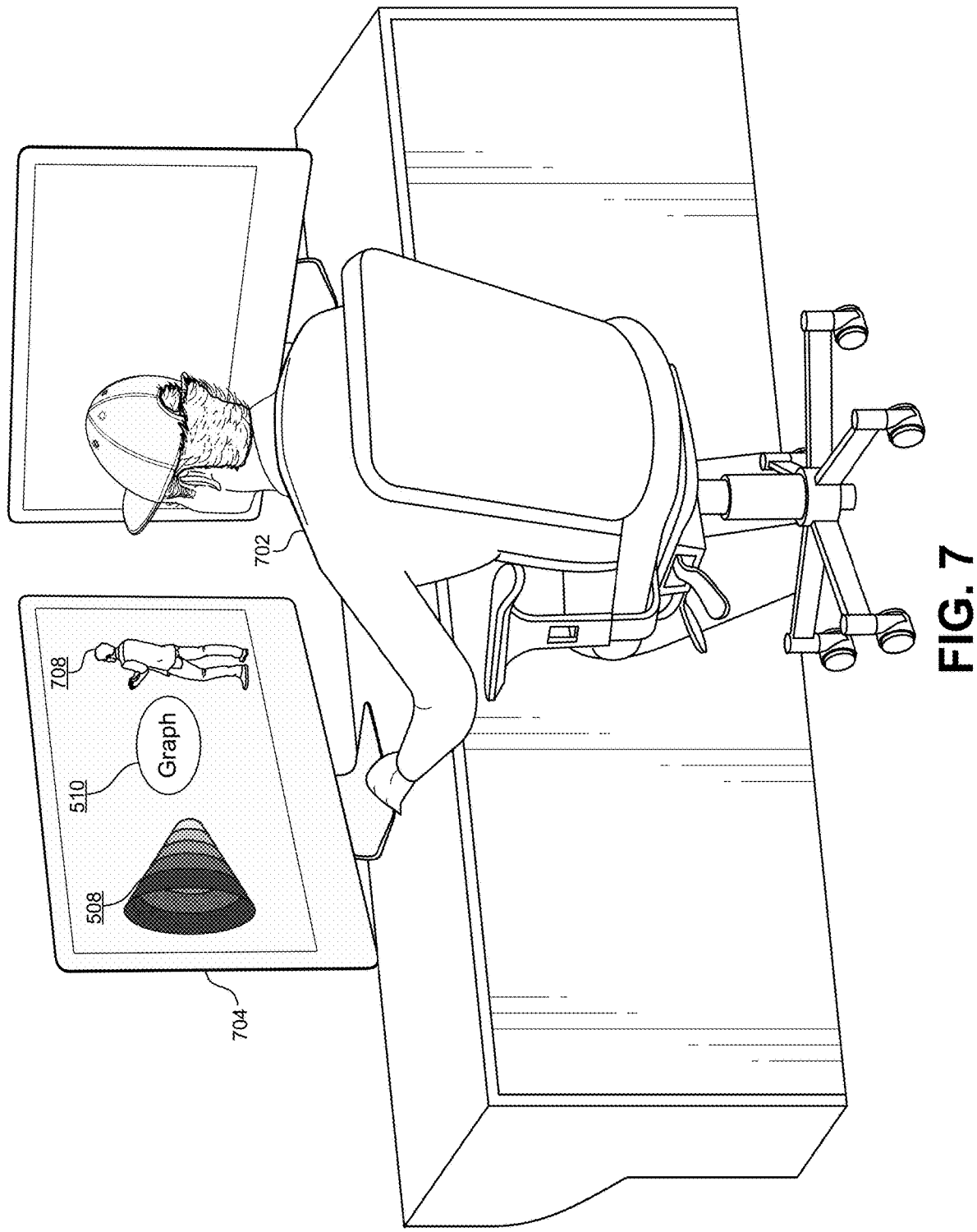
FIG. 7 illustrates a view of the virtual environment through a 2D screen interface, according to some embodiments.

FIG. 7 illustrates a view of the virtual environment 104 through a 2D screen interface, according to some embodiments. The user 702 may access the EDIE environment 102 through a desktop computer, laptop computer or other computing device equipped with a 2D screen interface. When viewing the virtual environment 104 on a 2D screen 704, a virtual camera may be placed in the virtual environment 104 to render a view of the virtual environment 104 from a perspective of the virtual camera. The rendered image may be displayed on the screen 704 for the user 702. The user may interact with various objects in the virtual environment 104 using a mouse or touch screen as they are displayed on the screen 704.

The virtual environment may include a plurality of visualization objects arranged in a dashboard display as described above. These visualization objects may include the funnel object 508, the graph object 510, and/or any other visualization object. Additionally, the image captured by the virtual camera and displayed on the screen 704 may include a location of other users in the virtual environment. The view of each user may be captured by a corresponding virtual camera in the virtual environment 104. Instead of displaying a virtual camera, the location of these cameras may include a display of an avatar or other representation of the other users. This example includes a visualization of user 708 in the virtual environment 104. The user 702 may interact and communicate with the user 708 through the virtual environment 104 as though they were both in the virtual environment 104 together. As the user 708 turns their virtual camera towards a virtual camera of the user 702, they may see a corresponding visualization or avatar representing the user 702 in the virtual environment 104.

As described above, the EDIE environment 102 may automatically determine that the screen 704 should display a 2D view of the virtual environment 104. The user 708 may be wearing a pair of virtual reality goggles, and the EDIE environment 102 operating on that client device may provide a 3D view of the virtual dashboard in the virtual environment 104. Therefore, users may all interact together using various devices in the same virtual environment. The type of device used by some users may not be readily apparent to other users in the virtual environment 104. For example, the user 708 may look at the virtual camera for the display on the screen 704 for the user 702, and instead of seeing a virtual camera, they may see an avatar in the virtual environment 104. The user 708 may not be able to distinguish whether the user 702 is using a virtual reality headset or a 2D display screen 704.

Figure 8:
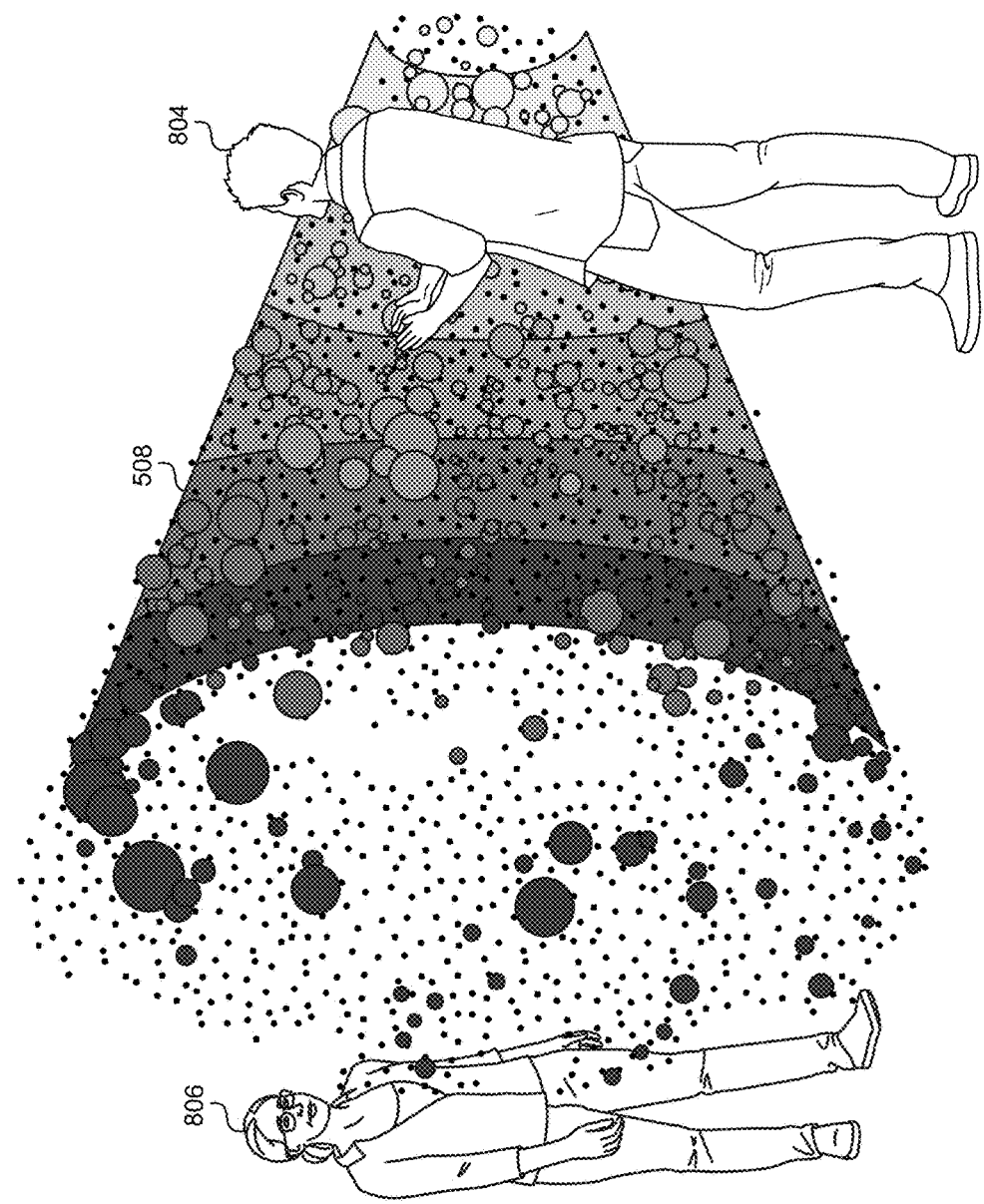
FIG. 8 illustrates a view of the virtual environment with a plurality of users interacting with a virtual dashboard, according to some embodiments.

FIG. 8 illustrates a view of the virtual environment 104 with a plurality of users interacting with a virtual dashboard, according to some embodiments. In this example, users 804, 806 are represented by avatars that have a human appearance. Users may choose avatars that look like themselves or any other virtual character. These avatars may move around the virtual environment 104 as users move around a real-world environment using a virtual reality headset. A virtual camera can move, rotate, pan, tilt, etc., as the user moves their head in the real-world environment. This allows the user to "walk around" the virtual dashboard in the virtual environment 104 to see the various visualization objects from different perspectives.

The movement of various users may be represented in the virtual environment 104 such that it is visible to other users. For example, compatible virtual reality equipment includes a virtual reality headset and selection devices that may be held in the user's hands. As the selection devices or the virtual reality headset are moved in the real-world environment, that movement may be used to drive the movement of the avatar in the virtual environment 104. For example, as user 408 lifts their hands in the real-world environment, the hands of the avatar may also be raised in the virtual environment 104 such they are visible to user 806. This allows users to gesture and point to visualization objects in the virtual dashboard and have those motions be visible to other users.

FIG. 8 also illustrates a virtual camera 802 that may be used to capture a view of the virtual environment 104 for an image to be displayed on a 2D screen. As described above, the depiction of the virtual camera 802 may be replaced with an avatar for the user 702 viewing the screen 704. Alternatively, the virtual camera 802 may have no visual equivalent in the virtual environment 104, or may be replaced by any other visual indicator as a 3D object that may be rendered for other users to see.

Users using both the 2D and 3D displays described above may interact with the elements of the visualization objects in the virtual dashboard. For example, user 804 may approach the funnel object 508 and select one of the spheres rotating around the funnel object 508. From a 2D display, the sphere may be selected using a finger tap or mouse click. From a 3D display, the sphere may be selected by using one of the handheld virtual reality devices held by the user 804 to reach out and "grab" one of the spheres as it rotates around the funnel object 508. The sphere may be bound to a data object in a data store as described above. For example, the sphere may represent a row in a database, and the location, color, speed, trajectory, etc., of the sphere in the funnel object 508 may be determined by different values in the columns of the row of the database. As the user 804 holds the sphere, additional information regarding the sphere may be displayed in a user interface or heads-up display (HUD). For example, each of the column values in the row of the database may be displayed for the user 804. The sphere may be passed back and forth between user 804 end-user 806 such that both users 804, 806 can view the details of the underlying data object.

When the user 804 has finished examining the sphere, the user 804 may place the sphere back in the funnel object 508. In some embodiments, the user 804 may "place" the sphere back in the funnel object 508, and the sphere may automatically return to its previous position/rotation in the funnel object 508. In other embodiments, the user 804 may place the sphere in the funnel object in a different location from which it was originally retrieved. As described above, the location of the sphere in the funnel object 508 may be determined by a value in an underlying data set that is bound to the funnel object 508. When the location of the sphere in the funnel object 508 is changed, the value corresponding to the location may also be changed. In some embodiments, a value corresponding to the new location in the funnel object 508 may be written back to the underlying data set. This allows users to manipulate elements of virtualization objects in the virtual environment 104 and change the values in the data sets to which the visualization objects are bound.

In some embodiments, the view of the visualization objects provided to each of the users 804, 806 may be the same. For example, when user 804 pulls the sphere out of the funnel object 508 as described above, user 806 would see the sphere leave the funnel object 508. Similarly, when user 804 places the sphere back in the funnel object 508, user 806 may see the new location of the sphere in the funnel object 508. Thus changes to the visualization objects and their underlying data sets may be common to each of the users using the virtual dashboard in the virtual environment 104.

In other embodiments, each of the users 804, 806 may be provided their own view of the visualization objects. In these embodiments, the state of each visualization object may be saved uniquely for each user 804, 806. For example when user 804 pulls the sphere out of the funnel object 508 as described above, user 806 would continue to see the sphere rotating in the funnel object 508. Therefore, changes made by one user 804 to elements of visualization objects would be seen only by that particular user 804. Other users 806 would continue to see the visualization objects in an unaltered state. Embodiments may handle changes made by one user to the underlying data sets according to a stored preference. For example, some embodiments may propagate changes to the underlying data sets, while others may provide the data sets in a "read-only" configuration such that changes to the visualization objects are not reflected in the underlying data sets. Some embodiments may present changes to all of the users present in the virtual environment 104 for approval before they are written to the underlying data set.

As described above, each visualization object may have one or more views or view models associated with the visualization object. These view models may control the look-and-feel of the visualization objects as they are rendered in the virtual environment 104. The EDIE environment 102 allows each user to select individual view models for the same visualization object. For example, user 804 may choose to view the funnel object 508 using a business view model that uses muted colors and smaller spheres. User 806 may choose to view the funnel object 508 using an informal view model that uses brighter colors and larger spheres. This allows each individual user to tailor the look-and-feel of visualization objects in the virtual dashboard without changing the view model for other users.

Figure 9:
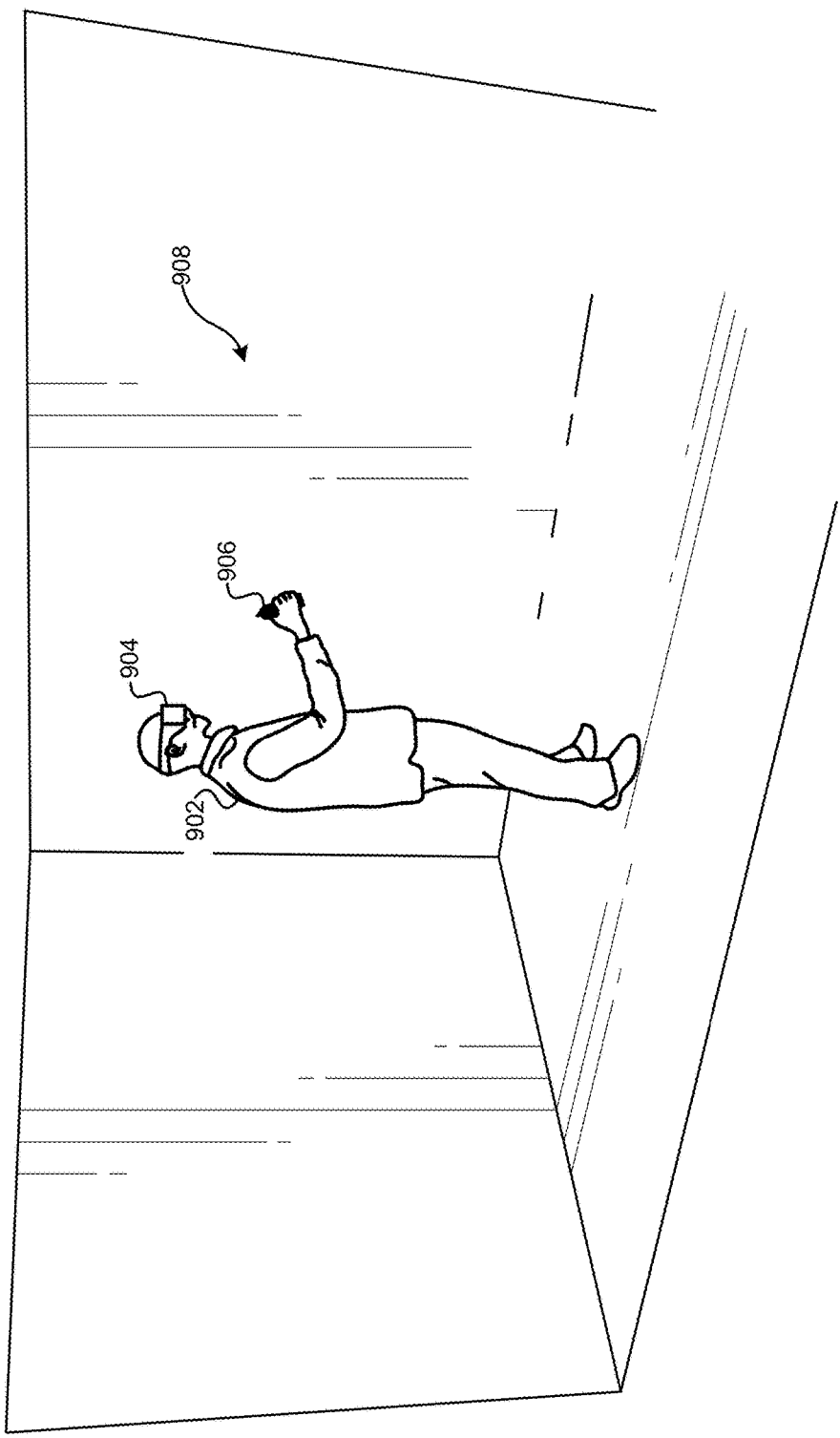
FIG. 9 illustrates a view of a real-world environment that may be used to interact with the virtual environment, according to some embodiments.

FIG. 9 illustrates a view of a real-world environment 908 that may be used to interact with the virtual environment 104, according to some embodiments. A user 902 may use virtual reality equipment, including a virtual reality headset 904 and/or one or more handheld selection devices 906. As the user 902 moves around the real-world environment 908, the virtual camera in the virtual environment 104 may move around the virtual environment 104 in a corresponding manner. The virtual camera may capture a view of the virtual environment 104 that is displayed to the user 902 through the virtual reality headset 904. As a user 902 moves their hands holding the selection devices 906, the hands of the corresponding avatar in the virtual environment 104 may also move and select objects in the virtual environment 104 as described above.

Figure 10:
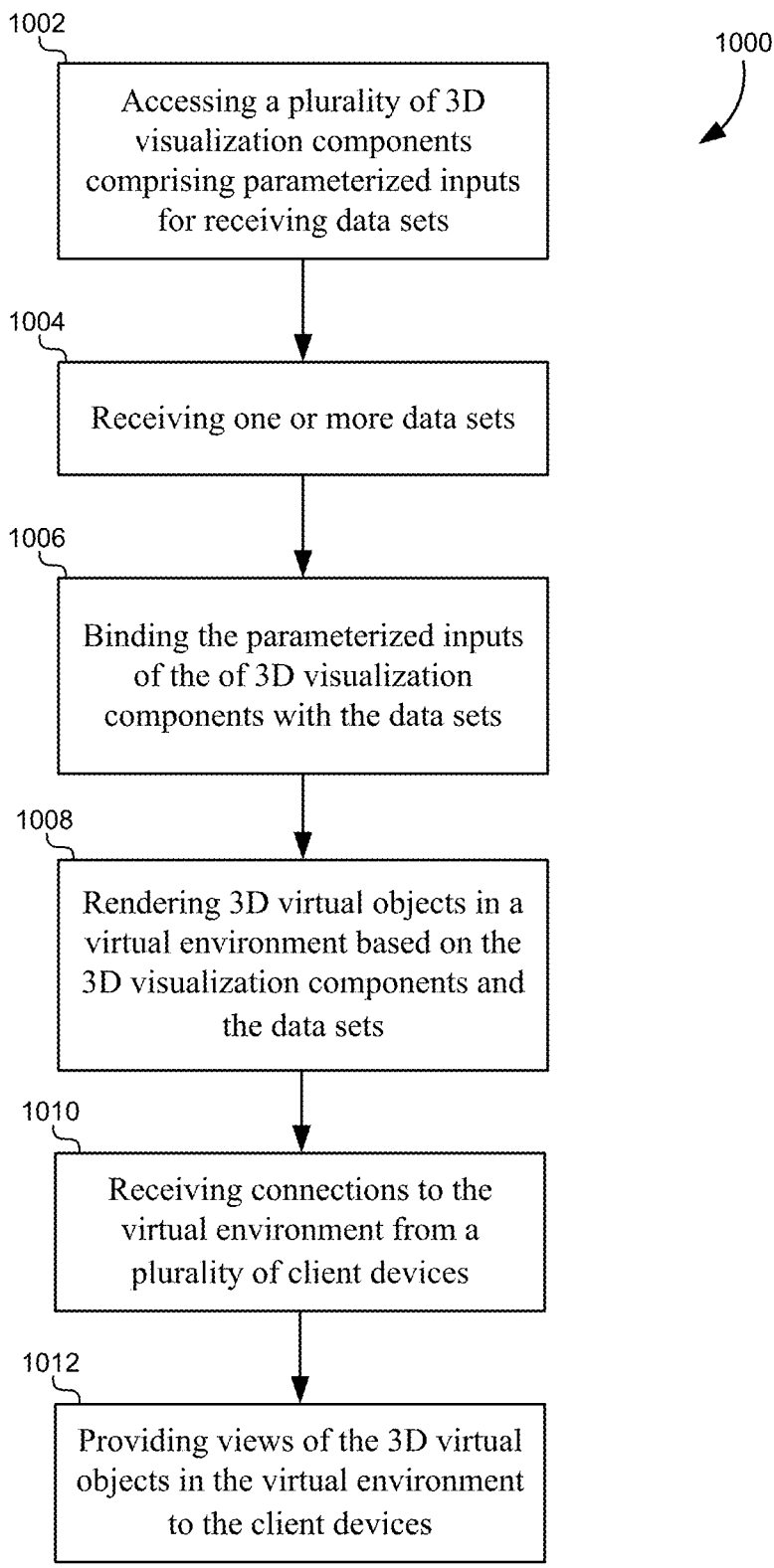
FIG. 10 illustrates a flowchart of a method for displaying data in the multi-dimensional dashboard, according to some embodiments.

FIG. 10 illustrates a flowchart 1000 of a method for displaying data in the multi-dimensional dashboard, according to some embodiments. The method may include accessing a plurality of 3D visualization components (1002). Each of the 3D visualization components may include parameterized inputs for receiving data sets. The 3D visualization components may be downloaded or otherwise received from a component exchange that allows developers to provide 3D visualization components to be used in a plurality of applications under development. The 3D visualization components may be downloaded to a client device or into an operating environment, such as the EDIE environment described above. For example, the 3D visualization components may include a funnel object, a graph object, and/or other visualization components described herein.

The method may also include receiving one or more data sets (1004). The data sets may represent enterprise data received from enterprise applications and/or databases. For example, the data sets may include a Customer Relationship Management (CRM) database, a Human Capital Management (HCM) database, a financial software database, and/or any other type of enterprise data available to the operating environment.

The method may additionally include binding the parameterized inputs of the plurality of 3D visualization components with the one or more data sets (1006). For example, for each of the 3D visualization components, the corresponding parameterized inputs may be bound to one of the one or more data sets. The parameterized inputs of the 3D visualization components may make the 3D visualization components generic, such that they can be tailored in their appearance and operation by virtue of the bound data set. The data sets may be bound to the corresponding 3D visualization component at design time when the component is placed in an application. The data sets may alternatively or additionally be bound when the 3D visualization component is instantiated at runtime. During runtime, the system may receive inputs (e.g., from a user) to change the data set binding to a different data set. Some 3D visualization components may be bound to a plurality of different data sets, each of which may define a visual or operational aspect of the 3D visualization component.

The method may further include rendering a plurality of 3D virtual objects in a virtual environment based on the plurality of 3D visualization components and the one or more data sets (1008). Each of the 3D visualization components may include a view model, an animation model, a wireframe skeleton, and/or other graphical constructs that may be used to generate a 3D virtual object in a virtual environment. The virtual environment may be implemented in the EDIE operating environment to create a 3D virtual scene that includes objects in addition to the 3D virtual objects from the 3D visualization components. For example, the virtual environment may be configured as a carousel of 3D virtual objects. In another example, the virtual environment may be configured as an enterprise dashboard that displays 3D objects as virtual "widgets" that may be viewed by users in a virtual environment. Each of the 3D virtual objects in the dashboard may be bound to different enterprise data sets from different databases and/or different applications. For example, the dashboard may provide summary data for financials, employees, operations, customers, and so forth, all in one unified display in a single virtual environment.

The method may also include receiving connections to the virtual environment from a plurality of client devices (1010). Some embodiments may include client devices that have a hardware detection process installed thereon configured to detect a type of display and/or input device used with the client device. The hardware detection process may automatically configure an interaction with the virtual environment to match the type of client device. For example, if the client device includes a virtual reality headset, the hardware detection process may be configured to provide an immersive view and/or interaction with the virtual environment such that the user feels as though they are working within the virtual environment rather than a real-world environment. If a client device includes a 2D screen (e.g., a monitor, a laptop computer, etc.), the hardware detection process may be configured to place a virtual camera in the virtual environment to capture a 2D image of the virtual environment at a location to be displayed on the 2D screen.

The method may additionally include providing a plurality of views to the plurality of 3D virtual objects in the virtual environment to the plurality of client devices (1012). Each of the client devices may be provided an individual view of the virtual environment. Additionally, each of the client devices may be configured to allow users to interact with the 3D virtual objects in the virtual environment to alter their display. For example, users may remove elements from virtual objects corresponding to individual elements in the corresponding data sets. Users may see a display that includes summary information about the data points in that data element, and they may be allowed to change certain data points. These changes may be updated in the underlying data sources to which the 3D virtual objects are bound. In some embodiments, changes may be immediately viewed by other users in the virtual environment. Alternatively, some changes may be visible only to the user making the change, such that each user is provided with an individualized view of the virtual environment.

It should be appreciated that the specific steps illustrated in FIG. 10 provide particular methods of displaying data in a multidimensional dashboard according to various embodiments. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Funnel Visualization

As described above, imported data sets may be represented by one or more visualization components in the virtual environment. Many different types of visualization components may be imported into the virtual environment to represent the data sets to which they are bound. The shape, design, and animations available with each visualization component may be specifically designed to provide a visual experience for the user to see, understand, and manipulate complex data sets. Instead of simply looking at a graph or 2D pie chart on a web page, the user may see advanced animations in three dimensions that can illustrate how the data changes over time, how the data interacts with each other, and what changes made propagated through the data to achieve a desired result. These visualization components offer distinct advantages over the traditional two-dimensional dashboard for displaying and interacting with enterprise data.

Figure 11:
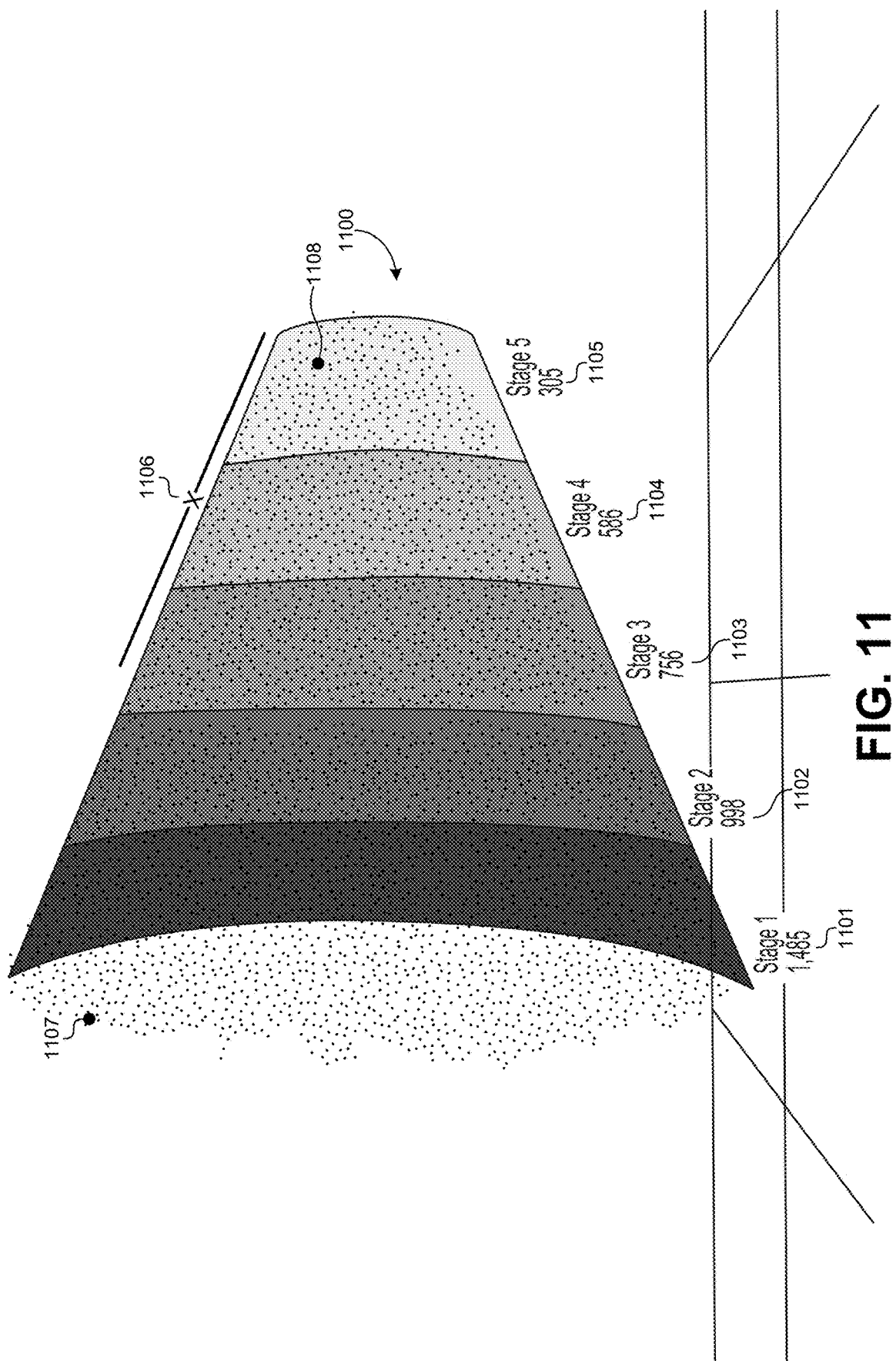
FIG. 11 illustrates an example of a visualization object in the form of a funnel, according to some embodiments.

The following figures illustrate a particular visualization component that may be useful for displaying and interacting with particular types of data. FIG. 11 illustrates an example of a visualization object in the form of a funnel 1100, according to some embodiments. The funnel 1100 may be referred to as a final object, a funnel visualization component, or a funnel 3D object. The funnel 1100 may be useful for visualizing large data sets having thousands or even millions of data points. The funnel 1100 may provide multiple simultaneous visual indicators that can convey information about each data point and about the set of data points collectively. These visual indicators may include a coloring of a data point, a size of the data point, a radial distance of the data point from the center of the funnel 1100, a radial angle of the data point, a speed of rotation of the data point around the funnel 1100, a distance along the length of the funnel 1100, and so forth. Attributes in the data set can be used to plot individual data points around the funnel 1100 and control their appearance and/or animation to simultaneously convey all of this information in a visual display to the user.

As described above, the visualization component for the funnel 1100 may be designed to be agnostic towards any particular data set. Instead, the funnel 1100 may include a set of parameterized inputs to which an existing data set may be bound. By way of example, the following discussion may use a particular type of data set to illustrate how that data set can be viewed and manipulated by the funnel 1100. This example data set may include a data table imported or accessed from a sales cloud application. This data table may include sales opportunities in each row of the data table. The different columns in the data table may include all the attributes of the sales opportunity. These attributes may include interactions between individuals, scores, progress indicators, and/or any other characteristic of progressing a sales opportunity to a completed sale. When the visualization component for the funnel 1100 is imported into an application, such as a virtual dashboard application, the application designer and/or user may select the table of sales opportunities as the data set to be represented by the funnel 1100. A 3D object representing the funnel 1100 may then be constructed using the data points from the data table to control the visual aspects of the funnel 1100. These visual aspects are described in detail below, but in short each of the rows in the data table may correspond to a sphere in the funnel 1100 that rotates around the funnel 1100. The rotation speed, angle, trajectory, color, size, and/or other characteristics of each sphere may be defined by the columns in the corresponding data row.

It will be understood that the use of sales opportunity data for the underlying data set for the funnel 1100 is used only by way of example it is not meant to be limiting. As emphasized above, the design of the visualization component for the funnel 1100 does not depend on the underlying data set. Instead, any data set may be tied to the funnel 1100 to populate the funnel 1100 with spheres representing data points. The sales opportunity information is just one example of a data set that illustrates how the attributes of data points can be visualized interactively using the funnel 1100. Other data sets may include financial data, scientific data, test or experimental data, survey data, and/or any other type of data source.

First, a distance 1106 on the funnel 1100 can convey meaning for each of the data points. The distance 1106 from the origin of the funnel 1100 may be determined by a value of a column for each row corresponding to a sphere in the funnel 1100. For example, for each individual data point, the distance 1106 can indicate a relative progression of a data point from a starting value to an end value. For example, for data points that represent sales opportunities, the farther away the data point is from the origin of the funnel 1100, the farther away the sales opportunity is from successful completion. Therefore, data point 1107 would represent a sales opportunity in the initial stages of progress, while data point 1108 would represent a sales opportunity that was nearing successful completion. The shape of the funnel 1100 itself may also convey this type of meaning. Using its physical counterpart, a funnel generally accepts new material at a larger open and, and then "funnels" that material (e.g., a liquid) around the funnel gradually towards the smaller end of the funnel. By using the shape of the funnel 1100 in the virtual environment, users may intuitively understand that data points will progress from an outer region that is larger towards a smaller region at the interior of the funnel that is smaller. Thus, the funnel 1100 is very useful for showing progress of individual data points within a large group of data points. When the funnel 1100 is constructed in the virtual environment, each sphere may be placed in the funnel at a location or distance 1106 based on this value from the data set.

In addition to showing progress of a single data point within a collection of data points, the funnel 1100 is also very useful for displaying overall trends in data point progress. In the illustration of FIG. 11, there are thousands of data points in the data set represented by small spheres in the funnel visualization. Along with the ability to focus on a single data point, this visualization provides the user with an illustration of clustering or natural groupings of data that illustrate trends in the data set. For example, a cluster of data points in the beginning stages of the funnel 1100 (e.g., Stage 1) that are a large distance from the origin (e.g., Stage 5) may represent a large number of sales opportunities in the beginning stages, whereas a small number of data points near the origin (e.g., Stage 5) of the funnel 1100 would illustrate that relatively few sales opportunities have been pursued to completion. The funnel 1100 may also quickly provide a way of assessing a total number of data points in the data set. For example, a sparsely populated funnel illustrates that very few sales opportunities are available. In contrast, a densely populated funnel at each level illustrates many opportunities that are equally distributed across different states of progression.

The natural grouping or clustering of data that is visually apparent in the funnel 1100 can be augmented by creating thresholds, striations, or groupings of data to be displayed in the rendering of the funnel itself 1100. For example, the funnel 1100 may include a first stage 1101, a second stage 1102, a third stage 1103, a fourth stage 1104, and a fifth stage 1105. The divisions between stages can be established by user-defined thresholds and can represent stages in the progress of data points towards an end result. For example, the first stage 1101 may represent sales opportunities that have been identified but not yet assessed or acted upon. The fifth stage 1105 may represent sales opportunities that have been nurtured to a completed sale. In some embodiments, each of the stages can be visually delineated as shown in FIG. 11 using defined boundaries, different color schemes, and/or other means of visually distinguishing data points in one stage from data points in another stage. In some embodiments, this may include a representation that appears to be a funnel itself, while other embodiments may simply form the funnel shape by virtue of the data points populating the funnel.

The different stages 1101, 1102, 1103, 1104, 1105 may be regularly spaced along the length of the funnel 1100. The relative width of each of the stages 1101, 1102, 1103, 1104, 1105 may be determined based on static spacing defined by the funnel 1100. The relative width may also be determined by a number of data points within each stage. For example, the width of the first stage 1101 may be larger when a larger population of data points resides in this first stage 1101. The color of the various stages may be transparent such that they shade the various regions of the funnel 1100 while still allowing the data points circulating within to be easily viewed. As described above, users may interact with the funnel by selecting individual data points rotating within the funnel 1100. The different stages need not be modeled as solid surfaces in the virtual environment, but instead a user may "reach through" each of the stages to interact with data points circulating therein.

Some embodiments may present the data points in the funnel 1100 in a static fashion without motion. Alternatively or additionally, some embodiments may also animate a motion of the data points in the funnel 1100 based on one or more attributes. For example, the data points in FIG. 11 can be animated to rotate a round a center axis of the funnel 1100 based on a frequency of actions involving specific data points. In the example of data points representing sales data, the speed with which individual data points rotate around the center axis of the funnel 1100 can be determined by the number or rate of sales actions that are taken for that data point (client contacts, emails, direct marketing, etc.). This allows a user to visually identify data points that are not being acted upon to explain their relative distance to the origin of the funnel 1100. Data points that are not moving or moving slowly indicate sales opportunities that are not progressing. In contrast, an opportunity that is in the first stage 1101 may be progressing quickly if it circulates at a high rate around the funnel 1100. This also provides a natural and realistic visualization of data points as they progress towards the origin of the funnel 1100. As with real world funnels, data points will progress by rotating around the center axis of the funnel 1100, gradually progressing towards the origin of the funnel 1100 and increasing speed until they reach the origin. This also provides a general overview of how efficiently and uniformly the data is progressing. By animating all of the data points, it becomes visually obvious which data points are receiving more or less attention than others, which data points are progressing slower or faster than others, along with other comparative visual information that can be easily conveyed with this visualization object.

Figure 12:
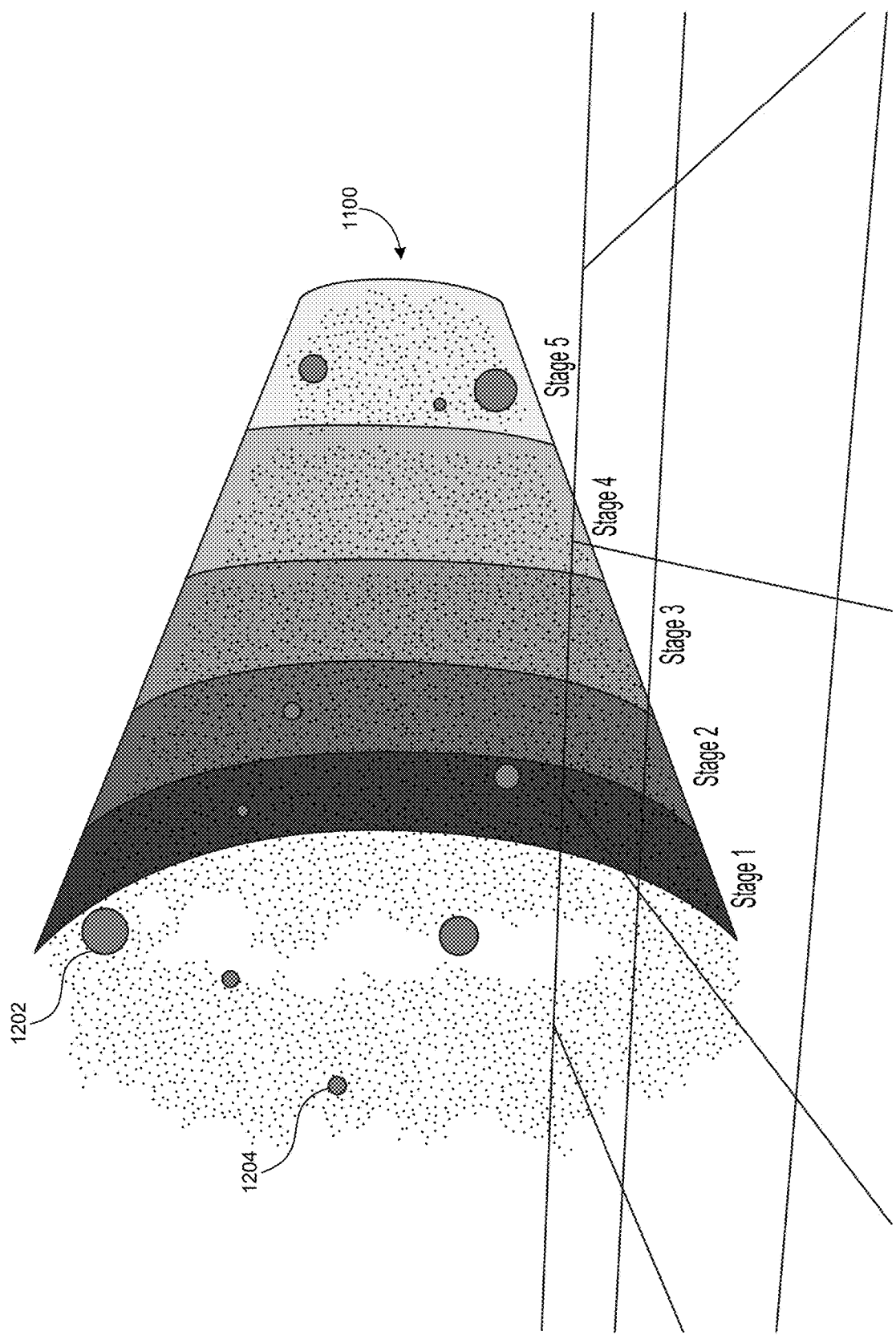
FIG. 12 illustrates how data points can be visualized using thresholds and other mechanisms to generate visual exceptions in the data set, according to some embodiments.

FIG. 12 illustrates how data points can be visualized using thresholds and other mechanisms to generate visual exceptions in the data set, according to some embodiments. In addition to viewing the collection of data points as a whole, the funnel 1100 can also be used to highlight individual data points with in that collection. In some embodiments, a user may establish a threshold. That threshold can then be compared to an attribute value in each data point in the data set. Attribute values that cross the threshold can have their corresponding data points highlighted in the visualization. In this example, each data point that does not cross the threshold can be represented as a small sphere rotating around the funnel 1100. In contrast, data points that do have attribute values that cross the threshold can be represented as larger spheres rotating around the funnel 1100. Thresholds can be adjusted and applied in real time to allow users to select thresholds based visually on the number of data points that are highlighted as exceptions. Some embodiments may use multiple thresholds, and assign increasing/decreasing sizes to the highlighted spheres based on their relative thresholds that are crossed.

In the example of FIG. 12, data point 1204 and other similarly sized data points may have crossed a first threshold. This causes them to be represented by spheres that are larger than the representations of the rest of the data points. Data point 1202 and other similarly sized data points may have crossed both the first threshold and an additional second threshold. This causes them to represented by spheres that are even larger than the representations of other data points (i.e., the more thresholds crossed, the larger the corresponding data point). This illustrates how the size of the spheres can be used to represent different thresholds. Alternatively or additionally, a single threshold may be used, and after exceeding that threshold, data points can increase in size in the visualization proportionally corresponding to the amount by which they exceed the threshold.

As described above, the view of the funnel 1100 and FIG. 12 may correspond to the view of a user wearing a virtual reality headset to "enter" into the virtual environment. The user may set these thresholds to highlight particular data points of interest in the funnel 1100. The user may then walk up to the funnel 1100 and grab any of the highlighted data points as they circulate around the funnel 1100. Some embodiments may present multiple methods for displaying more information for a selected data point chosen by the user from the funnel 1100. For example, a 2D panel may be presented on the screen to the user showing each of the column values in a row of data corresponding to the selected sphere.

Figure 13:
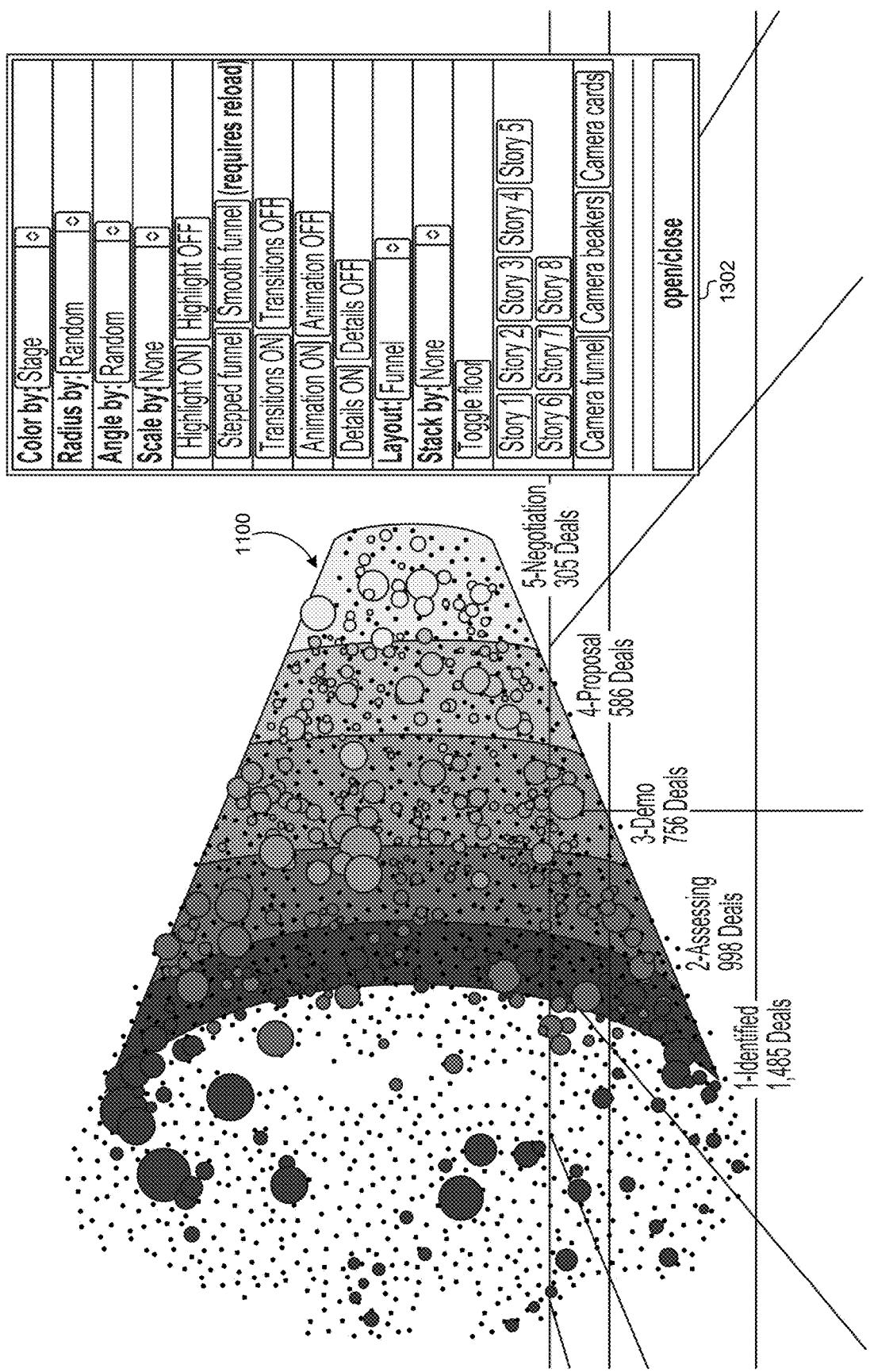
FIG. 13 illustrates a control panel for the funnel and how size, color, and stage details can be added to the animation of the funnel, according to some embodiments.

FIG. 13 illustrates a control panel for the funnel 1100 and how size, color, and stage details can be added to the animation of the funnel 1100, according to some embodiments. In this implementation, a control panel 1302 can be summoned to the rendering of the visualization objects in the virtual 3D environment for control by the user. In a 2D rendering, such as a tablet or smart phone screen, the control panel 1302 can be composited on top of any rendered image of the funnel 1100 from the virtual 3D space. Simultaneously, for users equipped with a VR/AR equipment, the control panel 1302 can be rendered as a three-dimensional object in the virtual 3D space, and these users may interact directly with the object representing the control panel 1302 using VR hand controls. For example, a VR user can cause the control panel 1302 to appear in front of them and can "push" controls on the control panel 1302 using their virtual hands equipped with VR sensors/devices.

The control panel 1302 can control all of the visual information displayed by the funnel 1100. For example, the user can control stage coloring as described above, the radius, angle, and scale for each of the data points, and whether certain data points should be highlighted or not. The control panel 1302 can also be used to select between different appearances for the funnel, such as being smooth or stepped. Transitions between final stages can be turned on or off, and the animated rotation of data points around the center axis of the funnel can be controlled. Details, such as labels for the stages and information for each of the data points can also be toggled in the control panel 1302.

FIG. 13 also illustrates how labels can be applied to each of the stages. For example, the first stage is labeled to represent identified sales opportunities, the second stage represents sales opportunities being assessed, the third stage represents sales opportunities that are at the demonstration stage, the fourth stage represents sales opportunities were proposals have been made, and the fit stage represents sales opportunities or negotiations are taking place. Each of these stages may also include a number of opportunities or deals that are currently classified within that stage. Thus, users have both a visual and numerical way of comparing numbers of data points in each stage.

In this embodiment, the size of each data point may be directly related to one or more attributes of the data points. Instead of, or in addition to, being sized based on threshold crossings, this embodiment uses size as a value indicator. When the actual value increases, the size of the data point can increase in a corresponding fashion. This allows users to evaluate individual data points as well as clusters of data points. For example, a cluster of large data points may indicate sales opportunities that are each worth a large monetary value. Size can be scaled in real-time and adjusted in real-time to represent different attributes using the control panel 1302.

In addition to size, FIG. 13 illustrates how color can also be used to indicate attribute values. In some embodiments, data points may be colored according to their corresponding stage. For example, data points in stage 1 may be purple, data points in stage 2 may be green, and so forth. In other embodiments, data points may be colored without regard for their stage, but can instead be colored based on any attribute value. For example, a spectrum (e.g., red-green, white-black, etc.) of colors can be used to indicate relative attribute values, such as approaching time deadlines or other key indicators.

Figure 14:
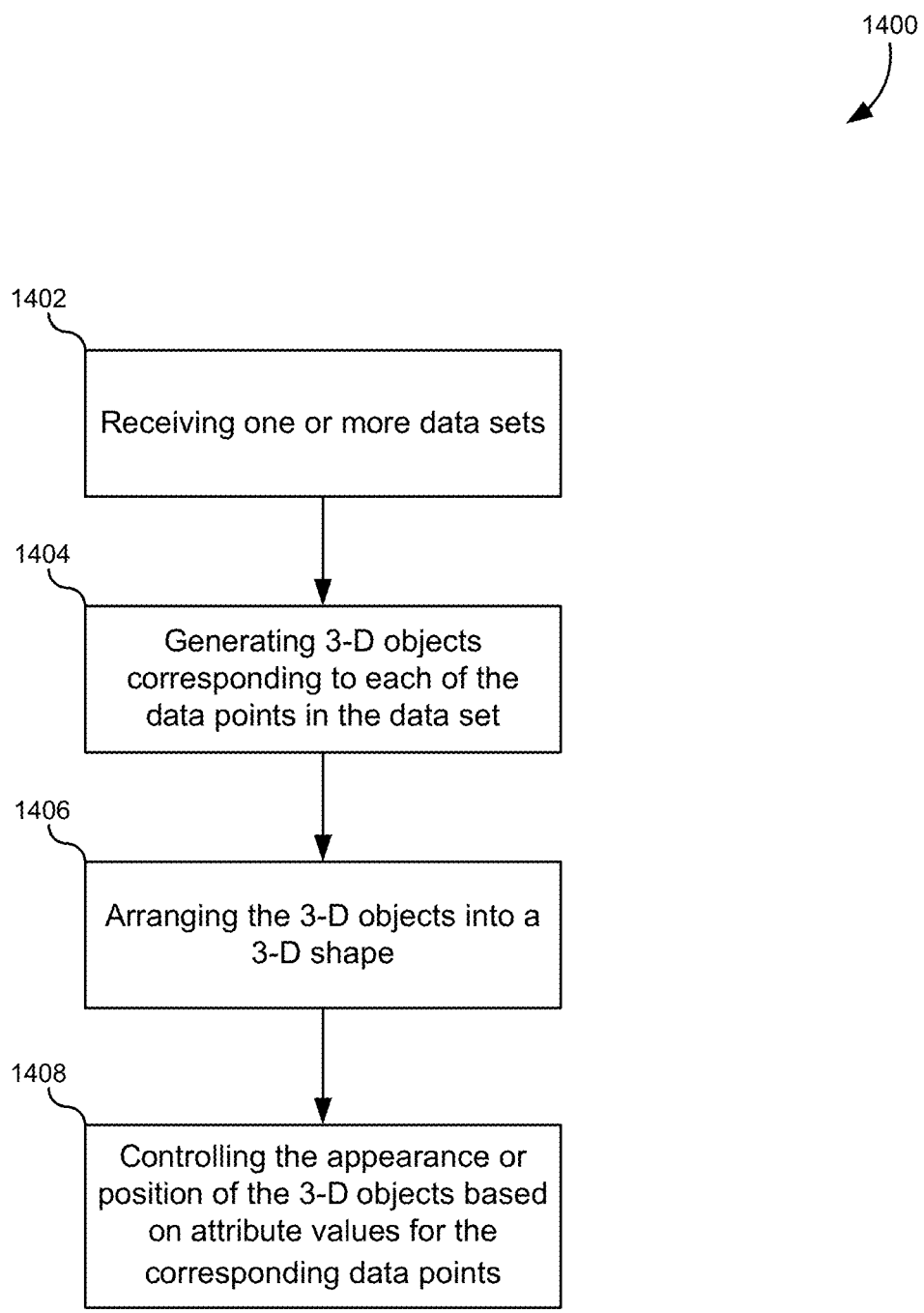
FIG. 14 illustrates a flowchart of a method for generating a visualization object from a set of data points, according to some embodiments.

FIG. 14 illustrates a flowchart of a method for generating a visualization object from a set of data points, according to some embodiments. The visualization object or visualization component may be downloaded from a component library or exchange and included in an application. The application may include a virtual environment that allows 3D objects to be created and rendered for generating views for multiple users using multiple client device types. As described above, a visualization object, such as the funnel object, may include a set of parameterized inputs that may be bound to underlying data sets. This method describes how these data sets may be used to generate the shape and appearance of a predetermined 3D shape.

The method may include receiving one or more data sets from enterprise applications (1402). The one or more data sets may be received from any type of data source, such as a database, a table, a spreadsheet, a text file, a CSV file, a web service, a website, an XML file, a storage repository, and/or any other type of data structure or data storage device. The data sets may be received from an application, such as an enterprise application providing enterprise data. The data may include CRM data, HCM data, financial data, sales data, and/or any other type of data. When the visualization component is loaded or downloaded, the designer and/or user may choose to bind the one or more data sets to the visualization component through one or more parameterized inputs.

The method may also include generating 3D objects corresponding to each of the data points in the one or more data sets (1404). Each of the 3D objects may correspond to a single data point in the one or more data sets. For example, each 3D object may correspond to a row in a database. Each object may also include a plurality of attributes or attribute values that may be associated with the data point. For example, the attribute values may include values stored in columns for a row in a database table. Each of these values may be used to construct the appearance and/or behavior of the 3D objects as described below. The 3D objects may comprise 3D spheres as described or otherwise depicted above. The 3D objects may also include any other type of three-dimensional object, such as bars, polygons, stars, and/or other solid objects.

The method may also include arranging the 3D objects into a predetermined 3D shape (1406). The 3D shape may be formed by the 3D objects themselves or may be created independently in the 3D virtual space with the 3D objects surrounding the 3D shape. For example, the 3D shape may comprise a funnel object as described and depicted above. The 3D objects may be arranged such that their collective arrangement forms the predetermined 3D shape. Alternatively, additional 3D objects, such as surfaces, wireframes, and/or other 3D constructs may be used to generate and represent at least a portion of the predetermined 3D shape. In these embodiments, the 3D objects may be arranged around the other 3D constructs such that they conform to the predetermined 3D shape.

The method may further include controlling the appearance or position of the 3D objects within the 3D shape based on attribute values for the corresponding data points (1408). For example, the position and/or appearance within the 3D shape may be controlled such that the color, size, position, and movements of the 3D objects are governed by corresponding attribute values. Some embodiments may also control the movement, trajectory, animation path, speed of rotation, and/or other movements over time as described in detail below.

It should be appreciated that the specific steps illustrated in FIG. 14 provide particular methods of generating a visualization object according to various embodiments of the present invention. Other sequences of steps may also be performed according to alternative embodiments. For example, alternative embodiments of the present invention may perform the steps outlined above in a different order. Moreover, the individual steps illustrated in FIG. 14 may include multiple sub-steps that may be performed in various sequences as appropriate to the individual step. Furthermore, additional steps may be added or removed depending on the particular applications. One of ordinary skill in the art would recognize many variations, modifications, and alternatives.

As mentioned briefly above, some embodiments may use motion or animations of data points corresponding to a time attribute to evaluate progress of data points through the funnel over time. Thus, a stationary view of the funnel 1100 may represent a snapshot of data points in time, and the movement of data points throughout the funnel over time can be visualized by animating a sequence of snapshot views of the funnel together into an animated sequence.

Figure 15:
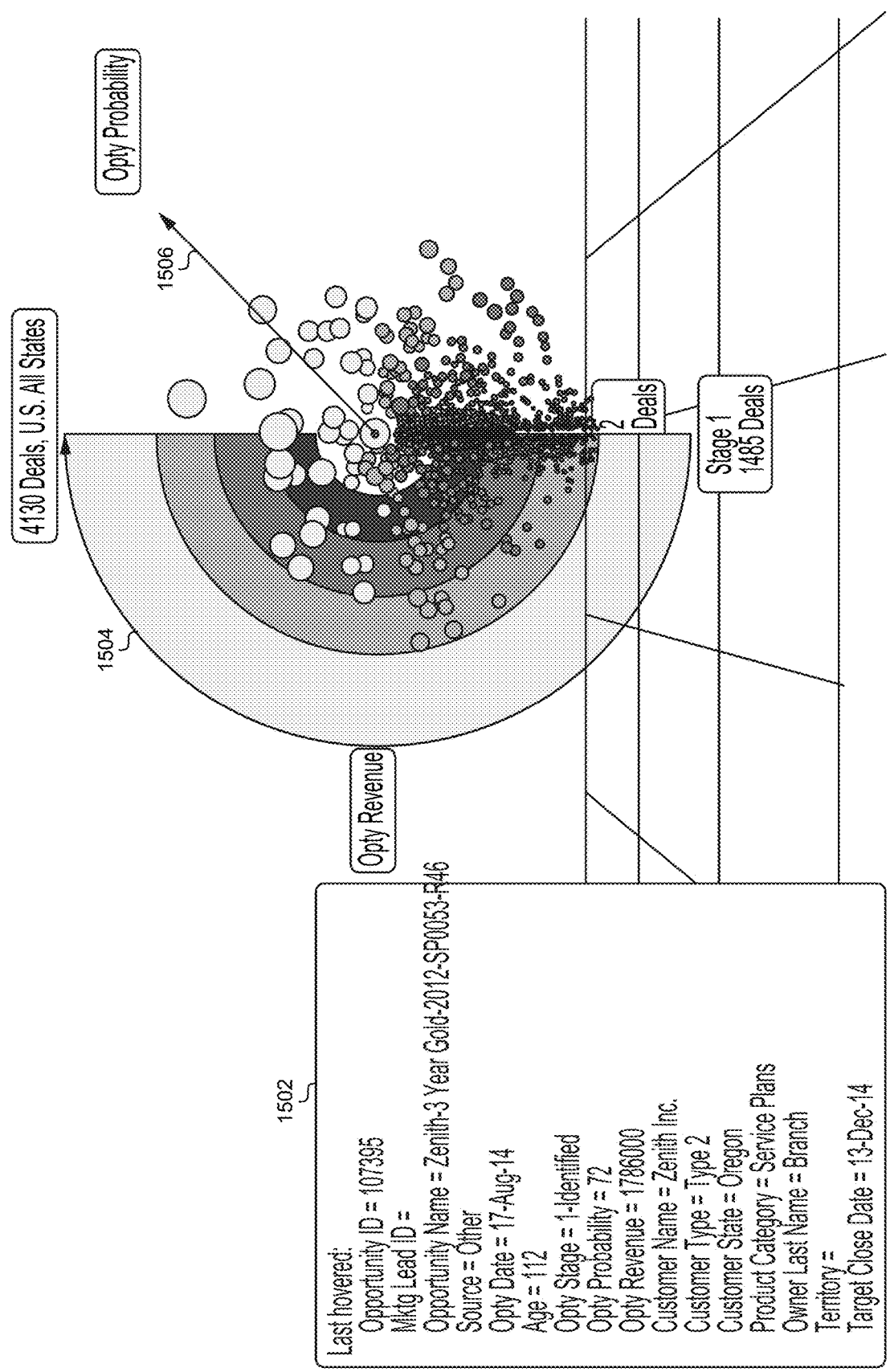
FIG. 15 illustrates an on-axis view of the funnel, according to some embodiments.

FIG. 15 illustrates an on-axis view of the funnel 1100, according to some embodiments. To view additional information for a specific data point, the user can hover a control (e.g., a mouse, a finger tap, a hand location in VR, etc.) over a particular data point, this can summon an information window 1502 that includes attribute values for that data point. In the example of FIG. 15, the information window includes attributes values such as an opportunity ID, name, date, age, type, probability of success, target close date, and so forth. This allows users to see in-depth information for selected data points.

With the on-axis view of the funnel 1100, the user can better view the speed and rotation angle 1506 of each of the data points. In some embodiments, the rotation angle itself can indicate an attribute value, and the animation would rotate the data point in real-time as the attribute value changes. For example, continuing with the sales data example, rotation angle around the funnel 1100 may indicate an opportunity probability of success. This allows users to quickly determine visually an overall probability for success for groups of data points. Animating these data points around the funnel 1100 can be accomplished by changing these attributes over time. For example, a user may request that the funnel illustrate changes in the probability of success over a one-year period. The animation of data points around the funnel 1100 would then move in an animation as the probabilities of success change throughout the year.

Alternatively or additionally, the speed 1504 of data point rotation can be tied to an attribute value rather than the angle of rotation. For example, the data points that rotate relatively fast can have a high probability of success, whereas data points that rotate relatively slow may have a low probability of success. In some embodiments, the rotation speed of the data points can be uniform, and they can rotate to simply provide a more three-dimensional view of the data points into the renderings such as on computer screens.

Figure 16:
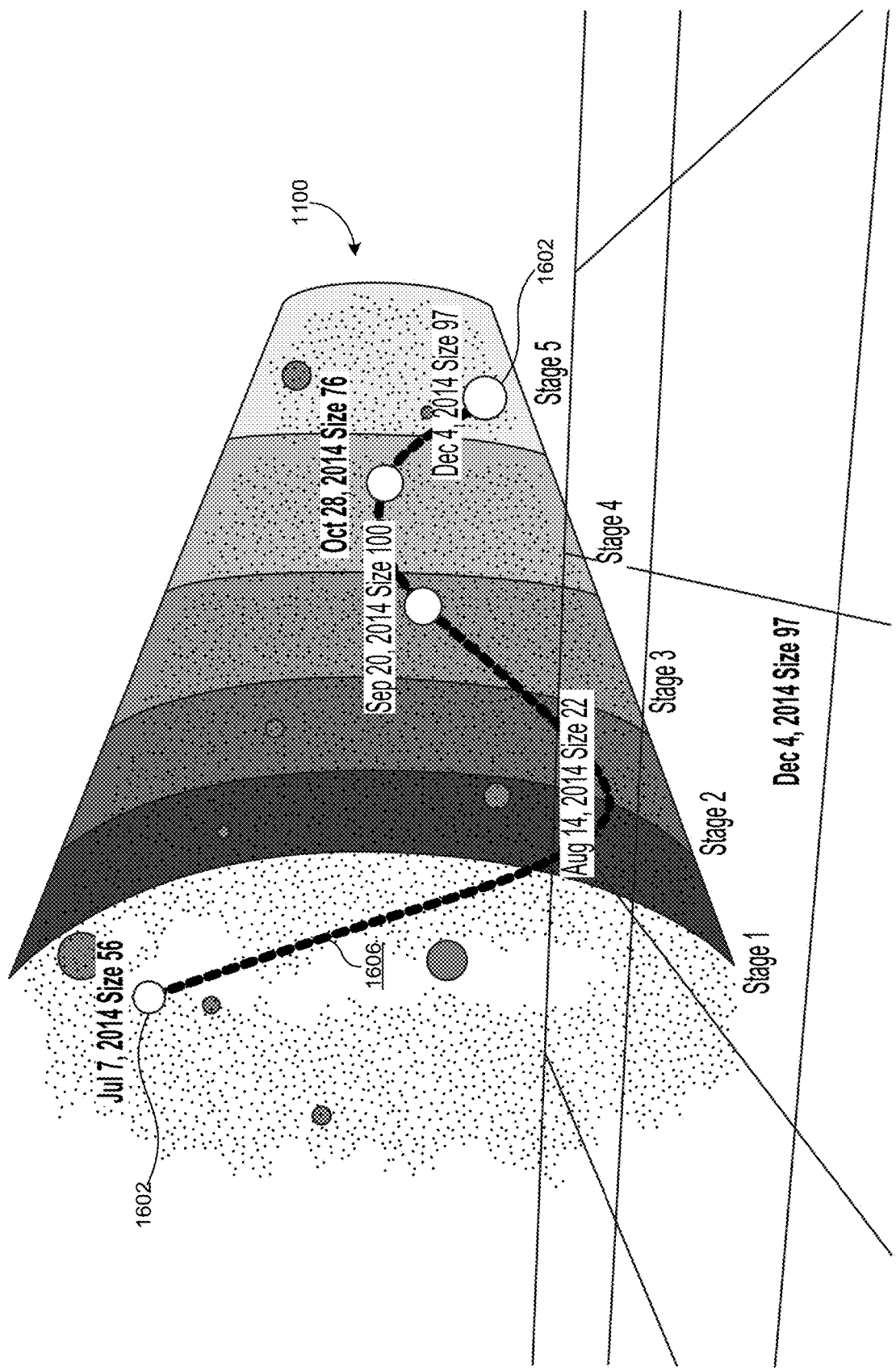
FIG. 16 illustrates a visualization of how the motion and/or animation of a data point can be tracked over time as attribute values for the corresponding data point change, according to some embodiments.

FIG. 16 illustrates a visualization of how the motion and/or animation of a data point can be tracked over time as attribute values for the corresponding data point change, according to some embodiments. In this example, a single sphere representing a single data point can be selected, and the path of this data point can be represented over time as it travels through the funnel 1100. The data point can be represented at a starting position 1602 and ending position 1604, and one or more positions in between. Each of these positions can be labeled with a timestamp (e.g., date, time, etc.) to indicate a time corresponding to each location. Spheres may be added to the funnel for each location in the time history of the data point. Spheres may be added for a specified time interval, such as one per week, one per month, one every 45 days, and so forth. Alternatively, a predefined number of spheres may be added and divided equally throughout the overall time interval.

In addition to representing multiple spheres, some embodiments may trace the progression of the data point through the funnel over time using a continuous line. In the example of FIG. 16, a path 1606 may be generated using a spline function in the virtual 3D space and rendered as part of the funnel display for the user. This balances the need to show the path of movement through the funnel without complicating the display by adding a large number of additional spheres. As described above, a user may hover an input control over any of the spheres or the pathway itself to trace the path of the data point. As the path is traced, information window may be summoned to display in real-time changing values of the attribute represented by the path 1606.

Figure 17:
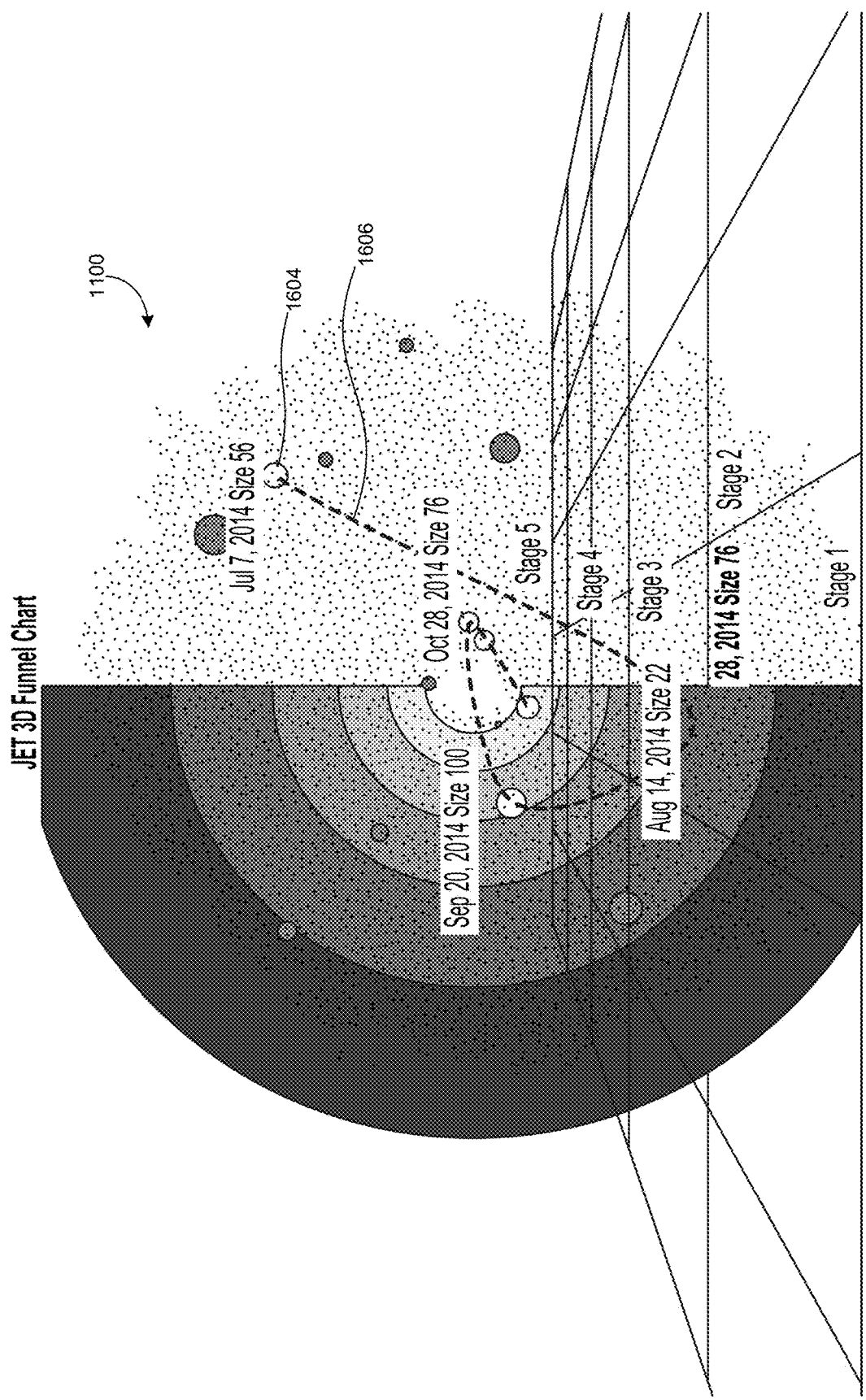
FIG. 17 illustrates a on-axis view of the funnel depicted in FIG. 16.

FIG. 17 illustrates a on-axis view of the funnel 1100 depicted in FIG. 16. This figure illustrates how a user can rotate or view the funnel 1100 from different angles. In a rendered 2D space, the user can pan around the funnel to see the data from different angles. In a virtual 3D environment, such as a AR/VR environment, the user can move around the representation of the funnel 1100 to view the funnel 1100 from different angles. The text labels for each of the data points can rotate such that they are always parallel to the view plane of the user. Therefore, the text for each user may be rendered independently such that the text appears to always face each individual user. By allowing the funnel 1100 to be viewed from different angles, the user can see and determine exactly the path taken by the selected data point.

Figure 18:
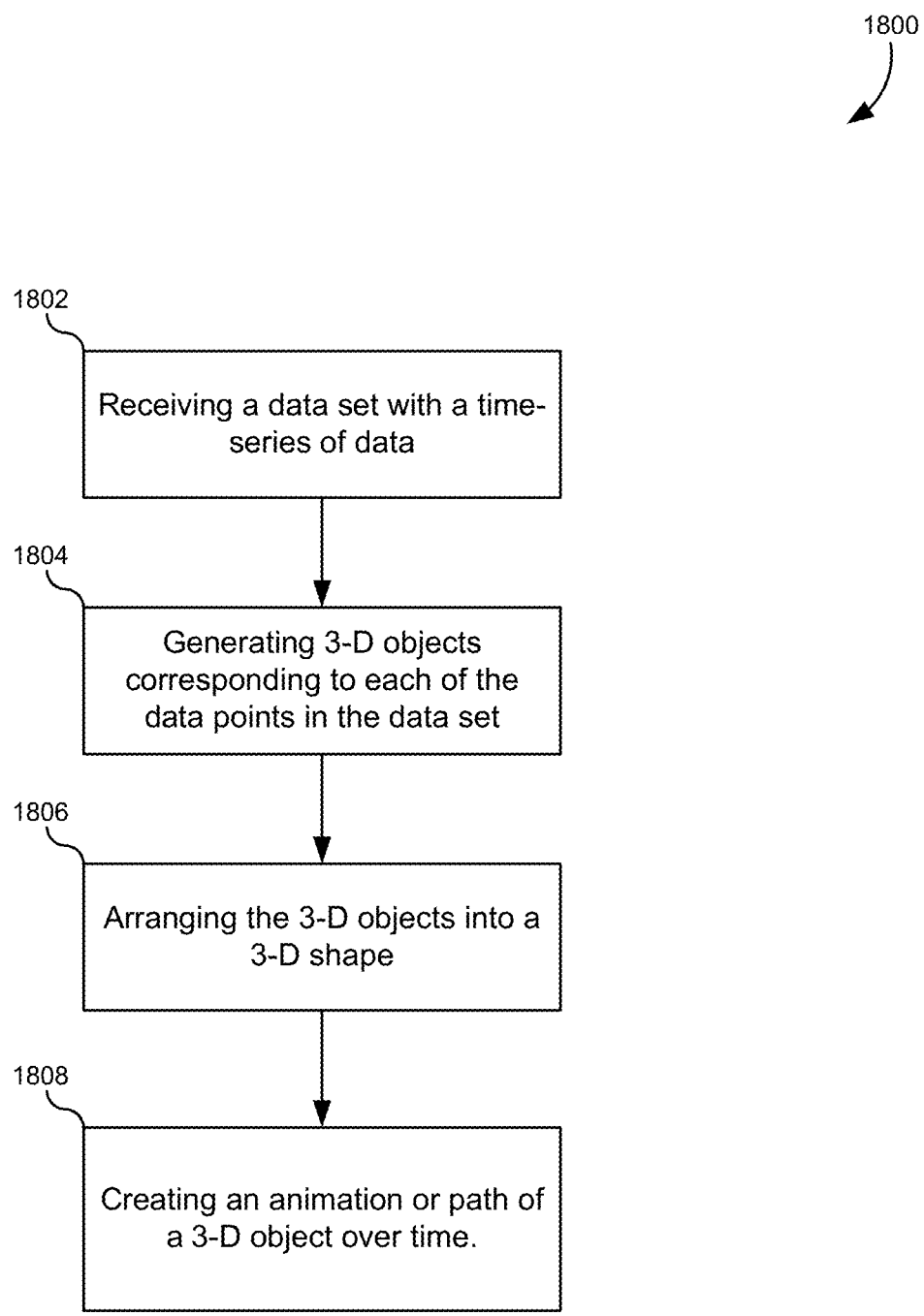
FIG. 18 illustrates a flowchart of a method for representing data changes over time, according to some embodiments.

FIG. 18 illustrates a flowchart of a method for representing data changes over time, according to some embodiments. The method may include receiving one or more data sets from enterprise applications (1802). The data set may include a time-series of data for a single data attribute. The method may also include generating 3D objects corresponding to each of the data points in the one or more data sets (1804). The 3D objects may comprise 3D spheres as described or otherwise depicted above. The method may also include arranging the 3D objects into a predetermined 3D shape (1806). The 3D shape may be formed by the 3D objects themselves or may be created independently in the 3D virtual space with the 3D objects surrounding the 3D shape. For example, the 3D shape may comprise a funnel object as described and depicted above. Each of these operations may be carried out as described above in relation to FIG. 14. The method may further include creating animation or path of a 3D object over time (1808). The information may include moving the 3D object through the 3D shape while leaving other 3D objects stationary. The path may include adding a spline curve to the visualization to indicate the path over time.

It should be appreciated that the specific steps illustrated in FIG. 18 provide particular methods of representing data changes over time according to various embodiments of the present invention. Other sequences of steps may also be performed according to alternative embodiments. For example, alternative embodiments of the present invention may perform the steps outlined above in a different order. Moreover, the individual steps illustrated in FIG. 18 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 19:
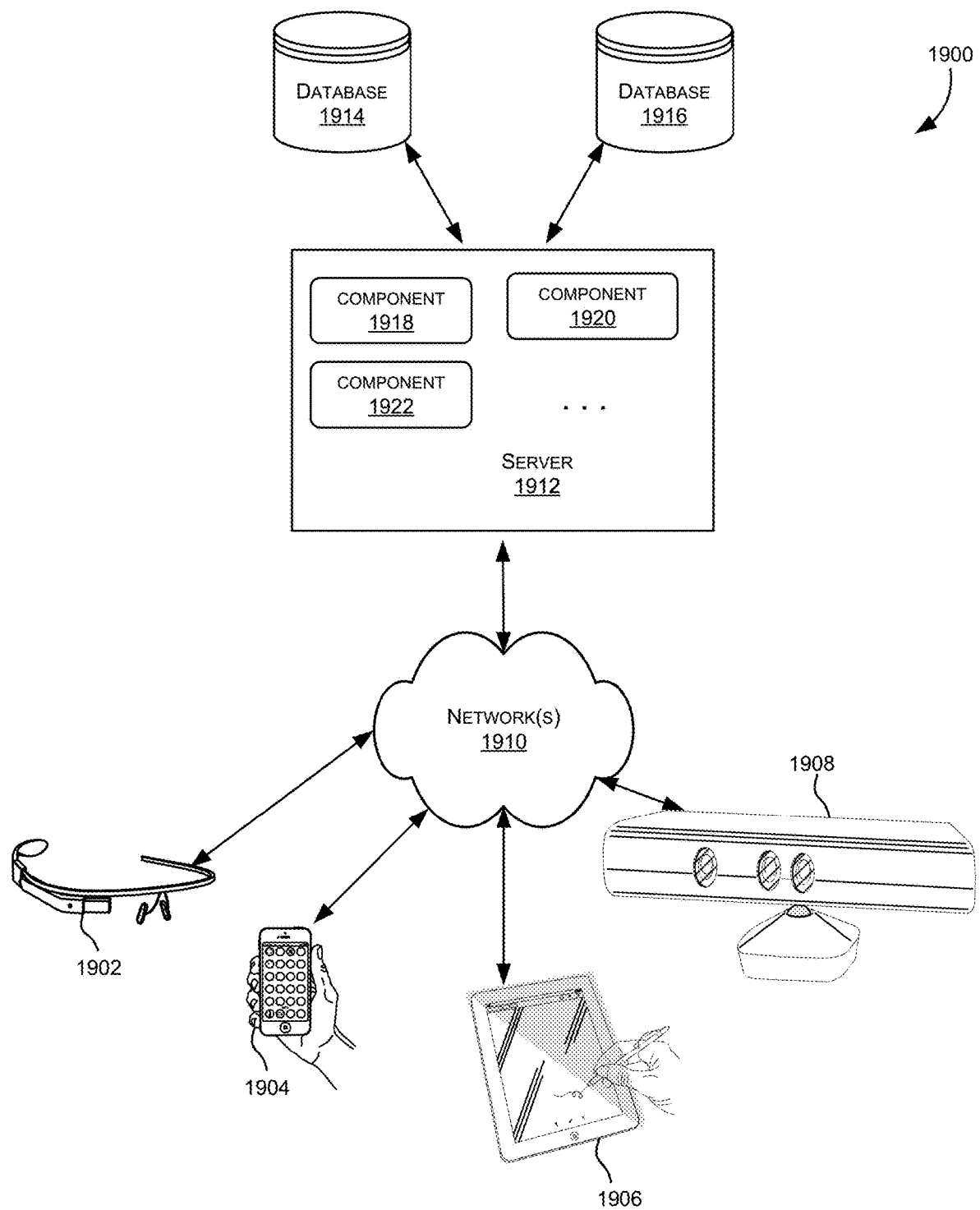
FIG. 19 depicts a simplified diagram of a distributed system for implementing some of the embodiments.

FIG. 19 depicts a simplified diagram of a distributed system 1900 for implementing one of the embodiments. In the illustrated embodiment, distributed system 1900 includes one or more client computing devices 1902, 1904, 1906, and 1908, which are configured to execute and operate a client application such as a web browser, proprietary client (e.g., Oracle Forms), or the like over one or more network(s) 1910. Server 1912 may be communicatively coupled with remote client computing devices 1902, 1904, 1906, and 1908 via network 1910.

In various embodiments, server 1912 may be adapted to run one or more services or software applications provided by one or more of the components of the system. In some embodiments, these services may be offered as web-based or cloud services or under a Software as a Service (SaaS) model to the users of client computing devices 1902, 1904, 1906, and/or 1908. Users operating client computing devices 1902, 1904, 1906, and/or 1908 may in turn utilize one or more client applications to interact with server 1912 to utilize the services provided by these components.

In the configuration depicted in the figure, the software components 1918, 1920 and 1922 of system 1900 are shown as being implemented on server 1912. In other embodiments, one or more of the components of system 1900 and/or the services provided by these components may also be implemented by one or more of the client computing devices 1902, 1904, 1906, and/or 1908. Users operating the client computing devices may then utilize one or more client applications to use the services provided by these components. These components may be implemented in hardware, firmware, software, or combinations thereof. It should be appreciated that various different system configurations are possible, which may be different from distributed system 1900. The embodiment shown in the figure is thus one example of a distributed system for implementing an embodiment system and is not intended to be limiting.

Client computing devices 1902, 1904, 1906, and/or 1908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1902, 1904, 1906, and 1908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1910.

Although exemplary distributed system 1900 is shown with four client computing devices, any number of client computing devices may be supported. Other devices, such as devices with sensors, etc., may interact with server 1912.

Network(s) 1910 in distributed system 1900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1910 can be a local area network (LAN), such as one based on Ethernet, Token-Ring and/or the like. Network(s) 1910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1912 may be adapted to run one or more services or software applications described in the foregoing disclosure. For example, server 1912 may correspond to a server for performing processing described above according to an embodiment of the present disclosure.

Server 1912 may run an operating system including any of those discussed above, as well as any commercially available server operating system. Server 1912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1912 may include one or more applications to analyze and consolidate data feeds and/or event updates received from users of client computing devices 1902, 1904, 1906, and 1908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1912 may also include one or more applications to display the data feeds and/or real-time events via one or more display devices of client computing devices 1902, 1904, 1906, and 1908.

Distributed system 1900 may also include one or more databases 1914 and 1916. Databases 1914 and 1916 may reside in a variety of locations. By way of example, one or more of databases 1914 and 1916 may reside on a non-transitory storage medium local to (and/or resident in) server 1912. Alternatively, databases 1914 and 1916 may be remote from server 1912 and in communication with server 1912 via a network-based or dedicated connection. In one set of embodiments, databases 1914 and 1916 may reside in a storage-area network (SAN). Similarly, any necessary files for performing the functions attributed to server 1912 may be stored locally on server 1912 and/or remotely, as appropriate. In one set of embodiments, databases 1914 and 1916 may include relational databases, such as databases provided by Oracle, that are adapted to store, update, and retrieve data in response to SQL-formatted commands.

Figure 20:
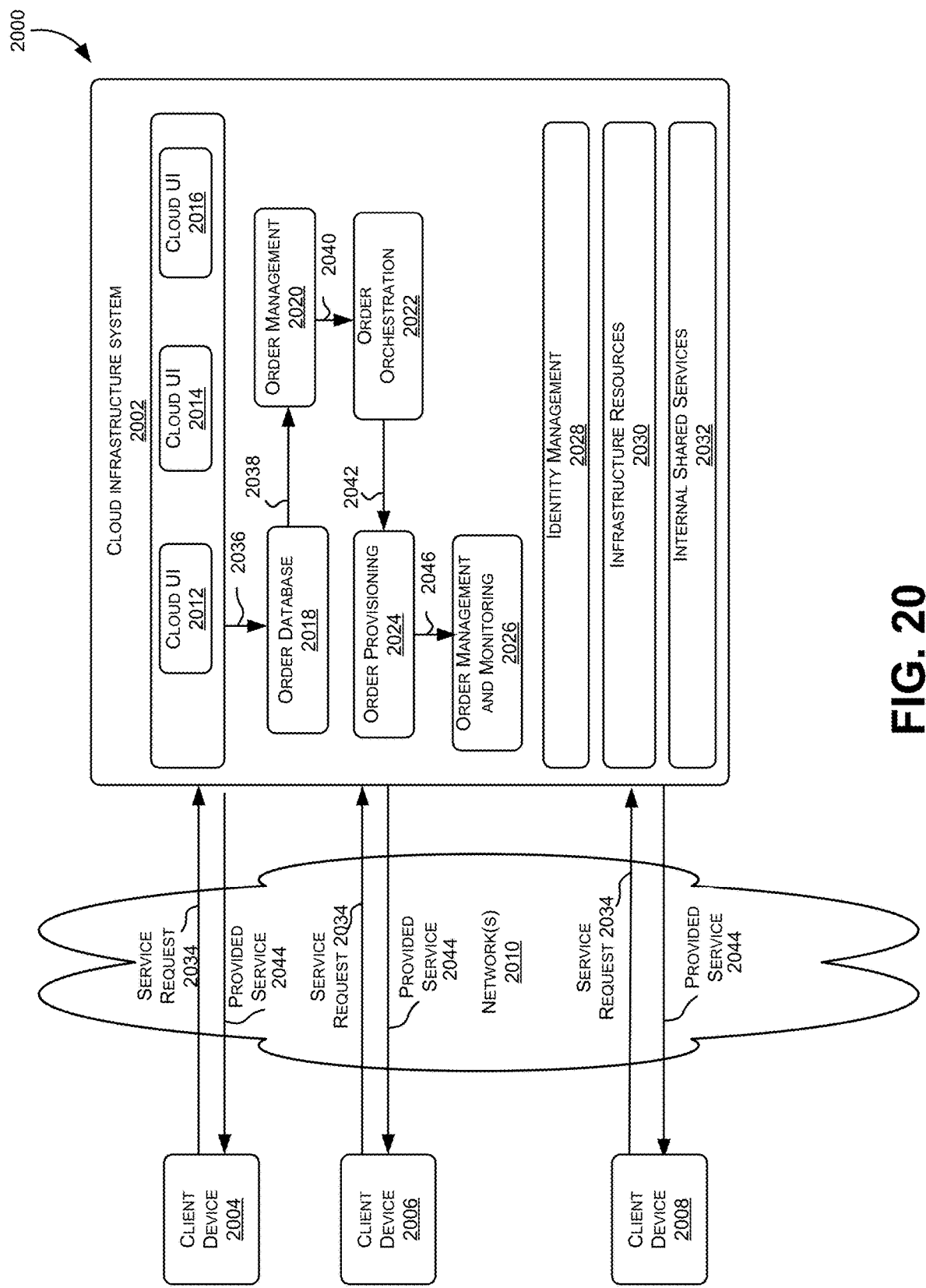
FIG. 20 is a simplified block diagram of one or more components of a system environment by which services provided by one or more components of an embodiment system may be offered as cloud services, according to some embodiments.

FIG. 20 is a simplified block diagram of one or more components of a system environment 2000 by which services provided by one or more components of an embodiment system may be offered as cloud services, in accordance with an embodiment of the present disclosure. In the illustrated embodiment, system environment 2000 includes one or more client computing devices 2004, 2006, and 2008 that may be used by users to interact with a cloud infrastructure system 2002 that provides cloud services. The client computing devices may be configured to operate a client application such as a web browser, a proprietary client application (e.g., Oracle Forms), or some other application, which may be used by a user of the client computing device to interact with cloud infrastructure system 2002 to use services provided by cloud infrastructure system 2002.

It should be appreciated that cloud infrastructure system 2002 depicted in the figure may have other components than those depicted. Further, the embodiment shown in the figure is only one example of a cloud infrastructure system that may incorporate an embodiment of the invention. In some other embodiments, cloud infrastructure system 2002 may have more or fewer components than shown in the figure, may combine two or more components, or may have a different configuration or arrangement of components.

Client computing devices 2004, 2006, and 2008 may be devices similar to those described above for 1902, 1904, 1906, and 1908.

Although exemplary system environment 2000 is shown with three client computing devices, any number of client computing devices may be supported. Other devices such as devices with sensors, etc. may interact with cloud infrastructure system 2002.

Network(s) 2010 may facilitate communications and exchange of data between clients 2004, 2006, and 2008 and cloud infrastructure system 2002. Each network may be any type of network familiar to those skilled in the art that can support data communications using any of a variety of commercially-available protocols, including those described above for network(s) 1910.

Cloud infrastructure system 2002 may comprise one or more computers and/or servers that may include those described above for server 1912.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 2002 may be adapted to automatically provision, manage and track a customer's subscription to services offered by cloud infrastructure system 2002. Cloud infrastructure system 2002 may provide the cloud services via different deployment models. For example, services may be provided under a public cloud model in which cloud infrastructure system 2002 is owned by an organization selling cloud services (e.g., owned by Oracle) and the services are made available to the general public or different industry enterprises. As another example, services may be provided under a private cloud model in which cloud infrastructure system 2002 is operated solely for a single organization and may provide services for one or more entities within the organization. The cloud services may also be provided under a community cloud model in which cloud infrastructure system 2002 and the services provided by cloud infrastructure system 2002 are shared by several organizations in a related community. The cloud services may also be provided under a hybrid cloud model, which is a combination of two or more different models.

In some embodiments, the services provided by cloud infrastructure system 2002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2002. Cloud infrastructure system 2002 then performs processing to provide the services in the customer's subscription order.

In some embodiments, the services provided by cloud infrastructure system 2002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2002 may also include infrastructure resources 2030 for providing the resources used to provide various services to customers of the cloud infrastructure system. In one embodiment, infrastructure resources 2030 may include pre-integrated and optimized combinations of hardware, such as servers, storage, and networking resources to execute the services provided by the PaaS platform and the SaaS platform.

In some embodiments, resources in cloud infrastructure system 2002 may be shared by multiple users and dynamically re-allocated per demand. Additionally, resources may be allocated to users in different time zones. For example, cloud infrastructure system 2030 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2032 may be provided that are shared by different components or modules of cloud infrastructure system 2002 and by the services provided by cloud infrastructure system 2002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 2002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 2002, and the like.

In one embodiment, as depicted in the figure, cloud management functionality may be provided by one or more modules, such as an order management module 2020, an order orchestration module 2022, an order provisioning module 2024, an order management and monitoring module 2026, and an identity management module 2028. These modules may include or be provided using one or more computers and/or servers, which may be general purpose computers, specialized server computers, server farms, server clusters, or any other appropriate arrangement and/or combination.

In exemplary operation 2034, a customer using a client device, such as client device 2004, 2006 or 2008, may interact with cloud infrastructure system 2002 by requesting one or more services provided by cloud infrastructure system 2002 and placing an order for a subscription for one or more services offered by cloud infrastructure system 2002. In certain embodiments, the customer may access a cloud User Interface (UI), cloud UI 2012, cloud UI 2014 and/or cloud UI 2016 and place a subscription order via these UIs. The order information received by cloud infrastructure system 2002 in response to the customer placing an order may include information identifying the customer and one or more services offered by the cloud infrastructure system 2002 that the customer intends to subscribe to.

After an order has been placed by the customer, the order information is received via the cloud UIs, 2012, 2014 and/or 2016.

At operation 2036, the order is stored in order database 2018. Order database 2018 can be one of several databases operated by cloud infrastructure system 2018 and operated in conjunction with other system elements.

At operation 2038, the order information is forwarded to an order management module 2020. In some instances, order management module 2020 may be configured to perform billing and accounting functions related to the order, such as verifying the order, and upon verification, booking the order.

At operation 2040, information regarding the order is communicated to an order orchestration module 2022. Order orchestration module 2022 may utilize the order information to orchestrate the provisioning of services and resources for the order placed by the customer. In some instances, order orchestration module 2022 may orchestrate the provisioning of resources to support the subscribed services using the services of order provisioning module 2024.

In certain embodiments, order orchestration module 2022 enables the management of business processes associated with each order and applies business logic to determine whether an order should proceed to provisioning. At operation 2042, upon receiving an order for a new subscription, order orchestration module 2022 sends a request to order provisioning module 2024 to allocate resources and configure those resources needed to fulfill the subscription order. Order provisioning module 2024 enables the allocation of resources for the services ordered by the customer. Order provisioning module 2024 provides a level of abstraction between the cloud services provided by cloud infrastructure system 2000 and the physical implementation layer that is used to provision the resources for providing the requested services. Order orchestration module 2022 may thus be isolated from implementation details, such as whether or not services and resources are actually provisioned on the fly or pre-provisioned and only allocated/assigned upon request.

At operation 2044, once the services and resources are provisioned, a notification of the provided service may be sent to customers on client devices 2004, 2006 and/or 2008 by order provisioning module 2024 of cloud infrastructure system 2002.

At operation 2046, the customer's subscription order may be managed and tracked by an order management and monitoring module 2026. In some instances, order management and monitoring module 2026 may be configured to collect usage statistics for the services in the subscription order, such as the amount of storage used, the amount data transferred, the number of users, and the amount of system up time and system down time.

In certain embodiments, cloud infrastructure system 2000 may include an identity management module 2028. Identity management module 2028 may be configured to provide identity services, such as access management and authorization services in cloud infrastructure system 2000. In some embodiments, identity management module 2028 may control information about customers who wish to utilize the services provided by cloud infrastructure system 2002. Such information can include information that authenticates the identities of such customers and information that describes which actions those customers are authorized to perform relative to various system resources (e.g., files, directories, applications, communication ports, memory segments, etc.) Identity management module 2028 may also include the management of descriptive information about each customer and about how and by whom that descriptive information can be accessed and modified.

Figure 21:
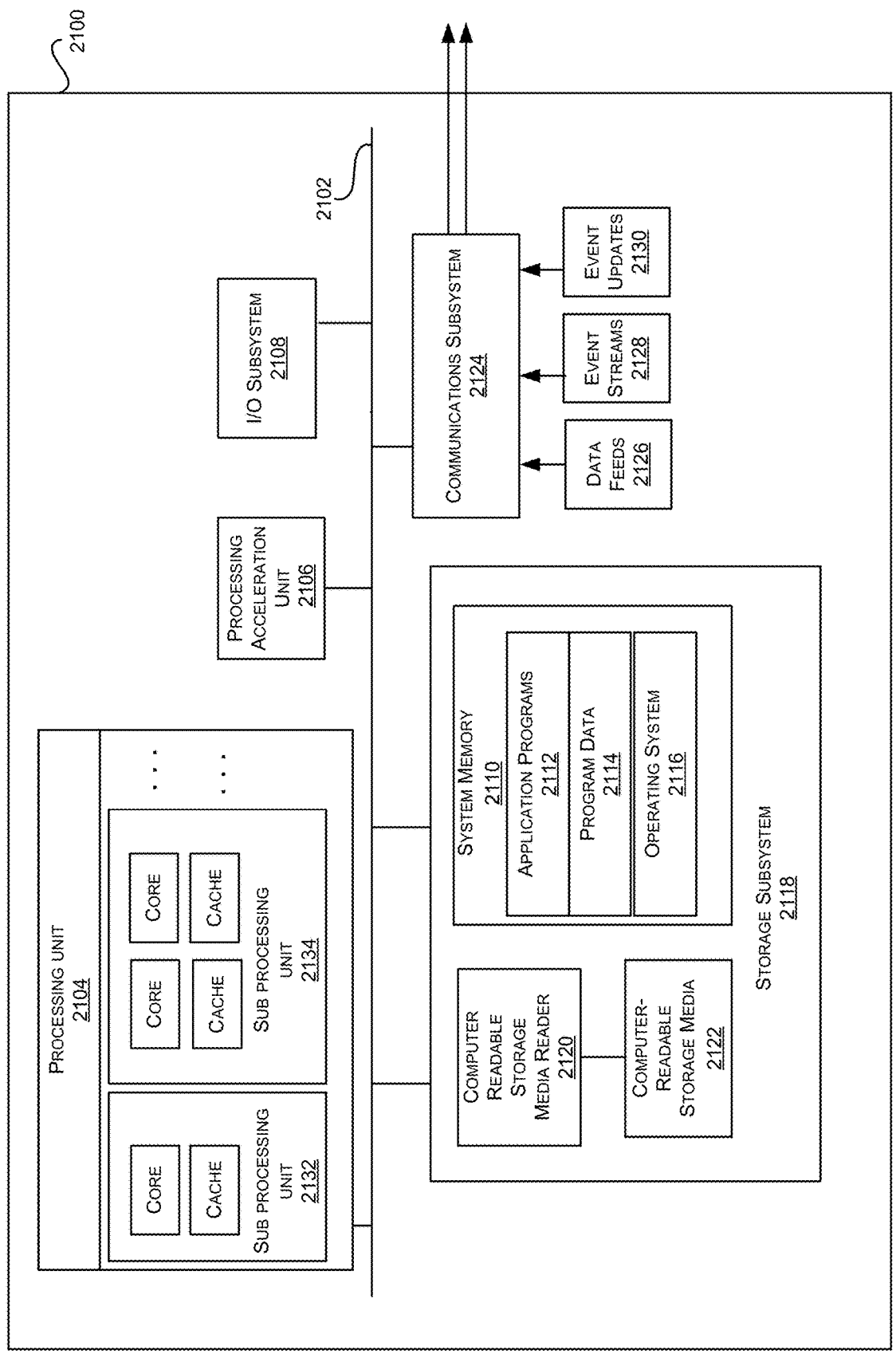
FIG. 21 illustrates an exemplary computer system, in which various embodiments may be implemented.

FIG. 21 illustrates an exemplary computer system 2100, in which various embodiments of the present invention may be implemented. The system 2100 may be used to implement any of the computer systems described above. As shown in the figure, computer system 2100 includes a processing unit 2104 that communicates with a number of peripheral subsystems via a bus subsystem 2102. These peripheral subsystems may include a processing acceleration unit 2106, an I/O subsystem 2108, a storage subsystem 2118 and a communications subsystem 2124. Storage subsystem 2118 includes tangible computer-readable storage media 2122 and a system memory 2110.

Bus subsystem 2102 provides a mechanism for letting the various components and subsystems of computer system 2100 communicate with each other as intended. Although bus subsystem 2102 is shown schematically as a single bus, alternative embodiments of the bus subsystem may utilize multiple buses. Bus subsystem 2102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2104, which can be implemented as one or more integrated circuits (e.g., a conventional microprocessor or microcontroller), controls the operation of computer system 2100. One or more processors may be included in processing unit 2104. These processors may include single core or multicore processors. In certain embodiments, processing unit 2104 may be implemented as one or more independent processing units 2132 and/or 2134 with single or multicore processors included in each processing unit. In other embodiments, processing unit 2104 may also be implemented as a quad-core processing unit formed by integrating two dual-core processors into a single chip.

In various embodiments, processing unit 2104 can execute a variety of programs in response to program code and can maintain multiple concurrently executing programs or processes. At any given time, some or all of the program code to be executed can be resident in processor(s) 2104 and/or in storage subsystem 2118. Through suitable programming, processor(s) 2104 can provide various functionalities described above. Computer system 2100 may additionally include a processing acceleration unit 2106, which can include a digital signal processor (DSP), a special-purpose processor, and/or the like.

I/O subsystem 2108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2100 may comprise a storage subsystem 2118 that comprises software elements, shown as being currently located within a system memory 2110. System memory 2110 may store program instructions that are loadable and executable on processing unit 2104, as well as data generated during the execution of these programs.

Depending on the configuration and type of computer system 2100, system memory 2110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2104. In some implementations, system memory 2110 may include multiple different types of memory, such as static random access memory (SRAM) or dynamic random access memory (DRAM). In some implementations, a basic input/output system (BIOS), containing the basic routines that help to transfer information between elements within computer system 2100, such as during start-up, may typically be stored in the ROM. By way of example, and not limitation, system memory 2110 also illustrates application programs 2112, which may include client applications, Web browsers, mid-tier applications, relational database management systems (RDBMS), etc., program data 2114, and an operating system 2116. By way of example, operating system 2116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2118 may also provide a tangible computer-readable storage medium for storing the basic programming and data constructs that provide the functionality of some embodiments. Software (programs, code modules, instructions) that when executed by a processor provide the functionality described above may be stored in storage subsystem 2118. These software modules or instructions may be executed by processing unit 2104. Storage subsystem 2118 may also provide a repository for storing data used in accordance with the present invention.

Storage subsystem 2100 may also include a computer-readable storage media reader 2120 that can further be connected to computer-readable storage media 2122. Together and, optionally, in combination with system memory 2110, computer-readable storage media 2122 may comprehensively represent remote, local, fixed, and/or removable storage devices plus storage media for temporarily and/or more permanently containing, storing, transmitting, and retrieving computer-readable information.

Computer-readable storage media 2122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2100.

By way of example, computer-readable storage media 2122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2122 may include, but is not limited to, Zip® drives, flash memory cards, universal serial bus (USB) flash drives, secure digital (SD) cards, DVD disks, digital video tape, and the like. Computer-readable storage media 2122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2100.

Communications subsystem 2124 provides an interface to other computer systems and networks. Communications subsystem 2124 serves as an interface for receiving data from and transmitting data to other systems from computer system 2100. For example, communications subsystem 2124 may enable computer system 2100 to connect to one or more devices via the Internet. In some embodiments communications subsystem 2124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2124 can provide wired network connectivity (e.g., Ethernet) in addition to or instead of a wireless interface.

In some embodiments, communications subsystem 2124 may also receive input communication in the form of structured and/or unstructured data feeds 2126, event streams 2128, event updates 2130, and the like on behalf of one or more users who may use computer system 2100.

By way of example, communications subsystem 2124 may be configured to receive data feeds 2126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2124 may also be configured to receive data in the form of continuous data streams, which may include event streams 2128 of real-time events and/or event updates 2130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2124 may also be configured to output the structured and/or unstructured data feeds 2126, event streams 2128, event updates 2130, and the like to one or more databases that may be in communication with one or more streaming data source computers coupled to computer system 2100.

Computer system 2100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method for generating a visualization object from a set of data points, the method comprising:
    receiving one or more data sets and an indication of a predetermined 3D shape;
    generating a plurality of 3D objects, each corresponding to data points in the one or more data sets, wherein each of the data points comprises a plurality of attribute values;
    visually arranging the plurality of 3D objects in a 3D environment into the predetermined 3D shape such that the predetermined 3D shape is formed by the plurality of 3D objects; and
    controlling the appearance and motion of the 3D objects within the predetermined 3D shape based on the plurality of attribute values for the corresponding data points in the one or more data sets.

2. The method of claim 1, wherein the predetermined 3D shape comprises a funnel object.

3. The method of claim 2, wherein the 3D objects comprise spheres that are arranged to form the funnel object.

4. The method of claim 3, wherein the spheres rotate around a circumference of the funnel object.

5. The method of claim 4, wherein the spheres rotate at a speed and/or radius that is determined by the attribute values for the corresponding data points.

6. The method of claim 4, wherein the spheres are colored based on the attribute values of the corresponding data points.

7. The method of claim 2, wherein the funnel object is divided into a plurality of sections.

8. The method of claim 7, wherein the plurality of 3D objects are located in the plurality of sections based on the attribute values for the corresponding data points.

9. A non-transitory computer-readable medium comprising instructions that, when executed by one or more processors, cause the one or more processors to perform operations comprising:
    receiving one or more data sets and an indication of a predetermined 3D shape;
    generating a plurality of 3D objects, each corresponding to data points in the one or more data sets, wherein each of the data points comprises a plurality of attribute values;
    visually arranging the plurality of 3D objects in a 3D environment into the predetermined 3D shape such that the predetermined 3D shape is formed by the plurality of 3D objects; and
    controlling the appearance and motion of the 3D objects within the predetermined 3D shape based on the plurality of attribute values for the corresponding data points in the one or more data sets.

10. The non-transitory computer-readable medium of claim 9, wherein the operations further comprise:
displaying an animation or path for one of the 3D objects over time.

11. The non-transitory computer-readable medium of claim 10, further comprising inserting timestamps into the predetermined 3D shape at a plurality of points along the animation or path.

12. The non-transitory computer-readable medium of claim 10, wherein the animation comprises the 3D object rotating around the predetermined 3D shape over time.

13. The non-transitory computer-readable medium of claim 10, wherein a speed of the animation is based on attributes of the corresponding data points in the one or more data sets.

14. The non-transitory computer-readable medium of claim 10, wherein the animation or path is represented by a spline object in a virtual environment.

15. A system comprising:
one or more processors; and
one or more memory devices comprising instructions that, when executed by the one or more processors, cause the one or more processors to perform operations comprising:
receiving one or more data sets and an indication of a predetermined 3D shape;
generating a plurality of 3D objects, each corresponding to data points in the one or more data sets, wherein each of the data points comprises a plurality of attribute values;
visually arranging the plurality of 3D objects in a 3D environment into the predetermined 3D shape such that the predetermined 3D shape is formed by the plurality of 3D objects; and
controlling the appearance and motion of the 3D objects within the predetermined 3D shape based on the plurality of attribute values for the corresponding data points in the one or more data sets.

16. The system of claim 15, wherein the operations further comprise:
providing a plurality of views of the plurality of 3D objects in a virtual environment to a plurality of client devices.

17. The system of claim 16, wherein the plurality of client devices comprises a virtual reality headset.

18. The system of claim 15, wherein the predetermined 3D shape comprises a funnel object.

19. The system of claim 18, wherein the 3D objects comprise spheres that are arranged to form the funnel object.

20. The system of claim 19, wherein the spheres rotate around a circumference of the funnel object.

* * * * *